United States Patent
Zaouk et al.

(10) Patent No.: US 9,873,361 B2
(45) Date of Patent: Jan. 23, 2018

(54) SUPPORTING DEVICES TO ENHANCE USER COMFORT IN A SEATED POSITION

(71) Applicant: IPNOS TECHNOLOGIES LLC, Los Angeles, CA (US)

(72) Inventors: Rabih Bachir Zaouk, Venice, CA (US); Pere Margalef-Valldeperez, Venice, CA (US); William Michael Dieter, Portland, OR (US)

(73) Assignee: IPNOS TECHNOLOGIES LLC, El Segundo, CA (US)

( * ) Notice: Subject to any disclaimer, the term of this patent is extended or adjusted under 35 U.S.C. 154(b) by 106 days.

(21) Appl. No.: 14/688,531

(22) Filed: Apr. 16, 2015

(65) Prior Publication Data
US 2015/0298589 A1    Oct. 22, 2015

Related U.S. Application Data

(60) Provisional application No. 61/981,144, filed on Apr. 17, 2014.

(51) Int. Cl.
*B60N 2/48*    (2006.01)

(52) U.S. Cl.
CPC .... *B60N 2/4879* (2013.01); *B60N 2002/4888* (2013.01)

(58) Field of Classification Search
CPC .......... B60N 2/4879; B60N 2002/4888; B60N 2/4805; A61F 5/05883; A61F 5/05891; A61F 5/3707
See application file for complete search history.

(56) References Cited

U.S. PATENT DOCUMENTS

| 491,651 | A | | 2/1893 | Jordan |
| 2,560,925 | A | | 7/1951 | Brown |
| 3,029,107 | A | | 4/1962 | Myers |
| 3,328,082 | A | | 6/1967 | Lilleso |
| 3,983,860 | A | * | 10/1976 | Bolton ............. F41B 3/02 124/20.1 |

(Continued)

FOREIGN PATENT DOCUMENTS

| DE | 20 2006 008 863 | 8/2006 |
| WO | WO 2013/063323 | 5/2013 |

OTHER PUBLICATIONS

Patent Cooperation Treaty International Searching Authority, "Invitation to Pay Additional Fees and, Where Applicable, Protest Fee," dated Feb. 7, 2013, in 8 pages, in International Application No. PCT/US2012/061995.

(Continued)

*Primary Examiner* — Timothy J Brindley
(74) *Attorney, Agent, or Firm* — Knobbe Martens Olson & Bear LLP

(57) ABSTRACT

The disclosure herein provides compact portable head supporting devices that secure a user's head in a position sufficient to enhance the user's comfort in a seated position. A head supporting device comprises: an elongate anchor member for positioning between a back of a user and a seat; a first head support member movably coupled to a distal end of the anchor member; a second head support member movably coupled to the distal end of the anchor member; and a flexible band coupled to and extending between distal ends of the first and second head support members.

15 Claims, 25 Drawing Sheets

(56) References Cited

U.S. PATENT DOCUMENTS

| | | | |
|---|---|---|---|
| 4,454,870 A * | 6/1984 | Schwentker | A61F 5/3707 128/869 |
| 5,010,898 A * | 4/1991 | de Kanawati | A61F 5/3707 128/845 |
| 5,199,940 A * | 4/1993 | Morris | A61F 5/055 128/845 |
| 5,242,377 A | 9/1993 | Boughner et al. | |
| 5,314,404 A | 5/1994 | Boughner et al. | |
| 5,685,831 A | 11/1997 | Floyd | |
| D404,239 S | 1/1999 | Denney | |
| 5,887,577 A * | 3/1999 | Sherrill | F41B 3/02 124/20.1 |
| 6,266,825 B1 | 7/2001 | Floyd | |
| 6,607,245 B1 | 8/2003 | Scher | |
| 6,726,280 B1 | 4/2004 | Liao | |
| 6,799,802 B1 | 10/2004 | Moran | |
| 6,893,096 B2 | 5/2005 | Bonn et al. | |
| 7,004,545 B2 | 2/2006 | Miller | |
| D582,045 S | 12/2008 | James | |
| D629,178 S | 12/2010 | Lindsay | |
| 8,141,955 B1 | 3/2012 | Maassarani | |
| D670,035 S | 10/2012 | Mieth et al. | |
| 8,287,045 B1 | 10/2012 | Donohue et al. | |
| 8,528,978 B2 | 9/2013 | Purpura et al. | |
| 8,834,394 B2 | 9/2014 | Ghajar | |
| 8,876,210 B2 | 11/2014 | Magstadt | |
| 2002/0067063 A1 | 6/2002 | Taborro | |
| 2004/0046435 A1 | 3/2004 | Bonn et al. | |
| 2004/0070252 A1 | 4/2004 | Stenzel et al. | |
| 2004/0245832 A1 | 12/2004 | Miller | |
| 2006/0108850 A1 | 5/2006 | Miller | |
| 2009/0200851 A1 | 8/2009 | Link | |
| 2009/0271904 A1 | 11/2009 | Bentley | |
| 2011/0113557 A1 | 5/2011 | Aguilera | |
| 2011/0271421 A1 | 11/2011 | Vahey | |
| 2013/0104274 A1 | 5/2013 | Zaouk et al. | |
| 2014/0300169 A1 * | 10/2014 | Dale | B60N 2/2851 297/397 |
| 2014/0325741 A1 | 11/2014 | Zaouk et al. | |
| 2015/0042143 A1 | 2/2015 | Maginness et al. | |
| 2015/0164171 A1 * | 6/2015 | Margetis | A42B 3/0473 2/6.6 |
| 2015/0202072 A1 * | 7/2015 | Glazener | A61F 5/02 602/18 |
| 2015/0260475 A1 * | 9/2015 | Monnig | F41A 11/04 124/20.1 |
| 2016/0250954 A1 * | 9/2016 | Gomez | B60N 2/4879 297/397 |

OTHER PUBLICATIONS

Patent Cooperation Treaty, Patent Cooperation Treaty International Searching Authority, "Notification of Transmittal of the International Search Report and the Written Opiion of the International Searching Authority, or the Declaration," dated Jun. 11, 2013, in 15 pages, in International Application No. PCT/US2012/061995.

* cited by examiner

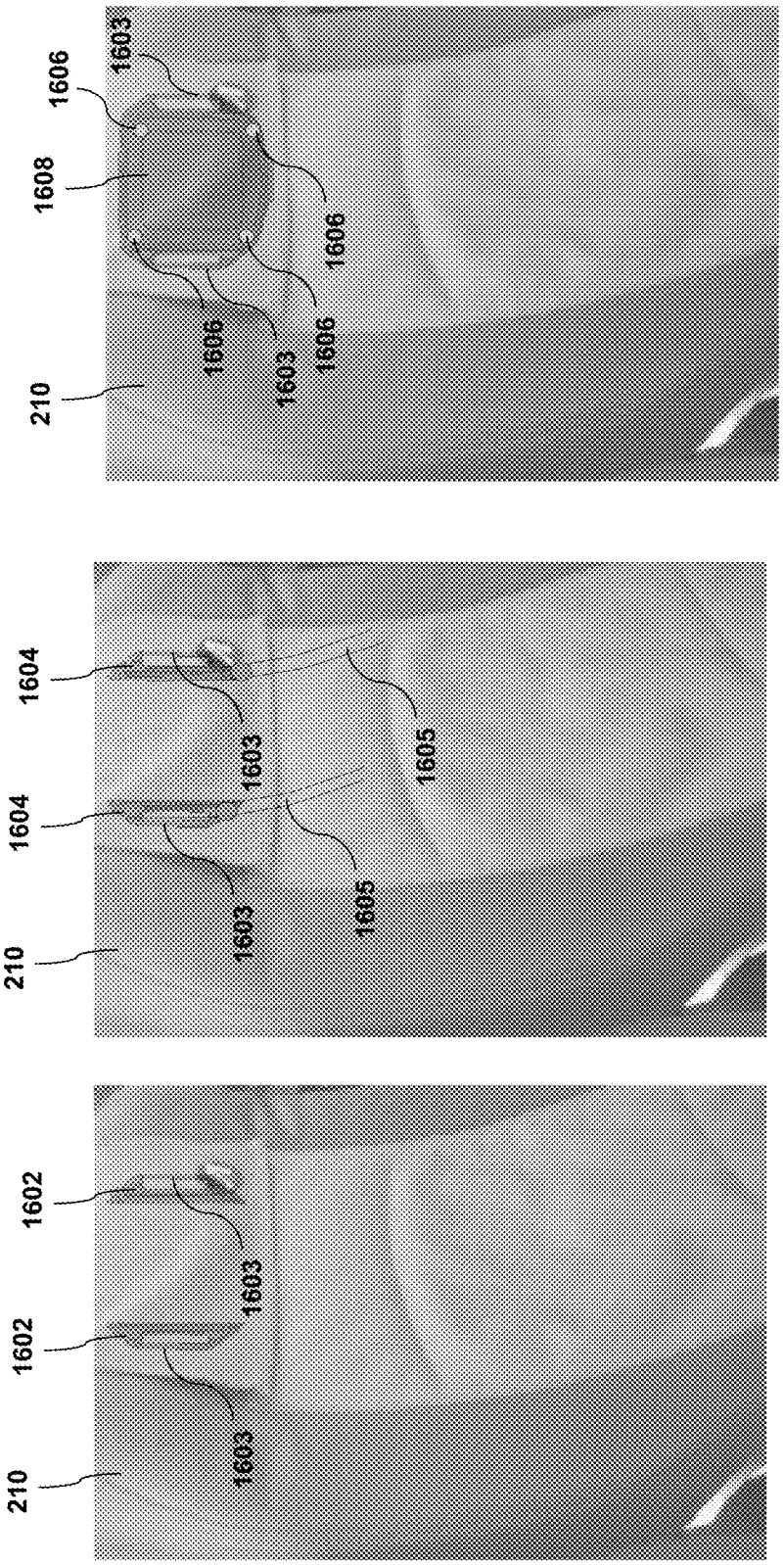

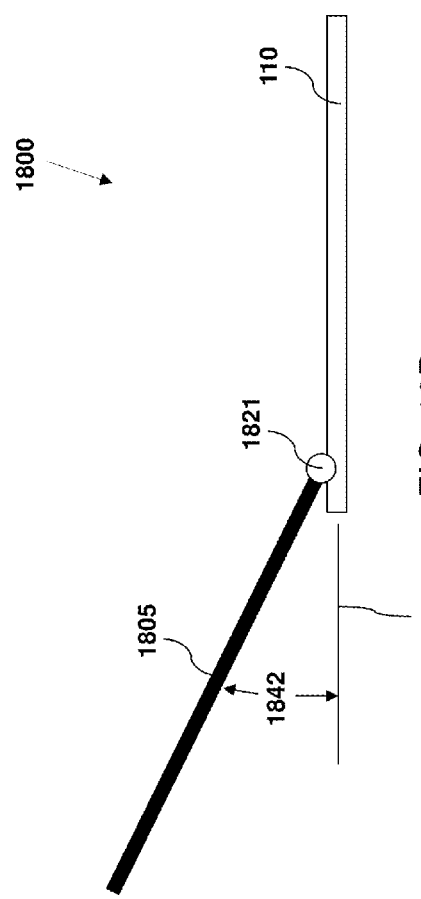
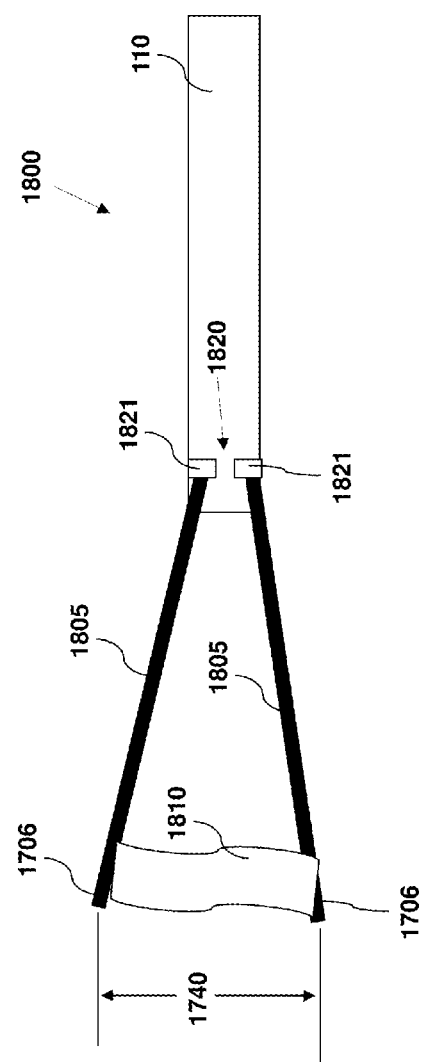

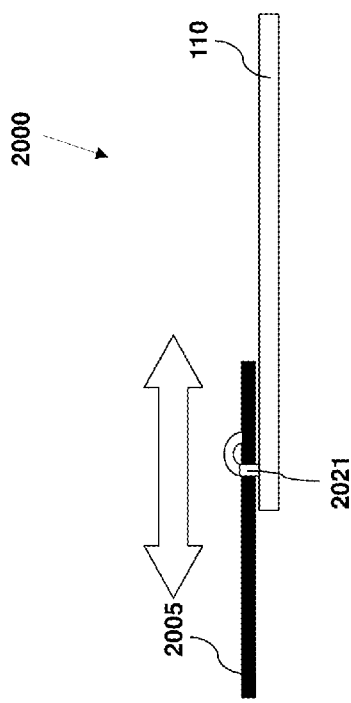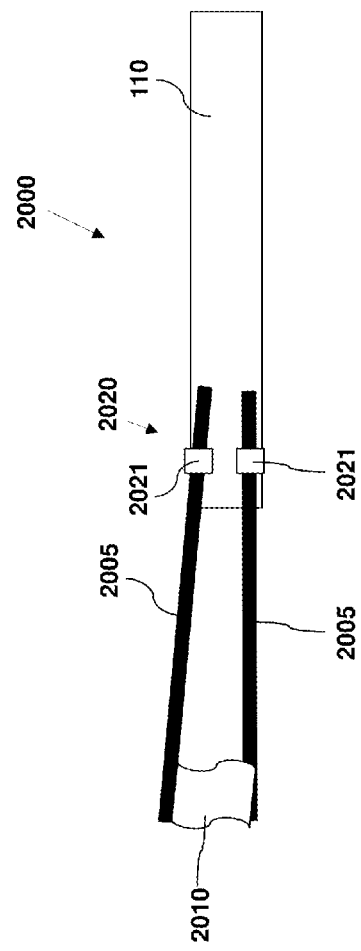

SUPPORTING DEVICES TO ENHANCE USER COMFORT IN A SEATED POSITION

CROSS-REFERENCE TO RELATED APPLICATIONS

This application claims the benefit of U.S. Provisional Patent Application No. 61/981,144, titled SUPPORTING DEVICES TO ENHANCE USER COMFORT IN A SEATED POSITION, filed Apr. 17, 2014. This application is related to U.S. Provisional Patent Application No. 61/551,591, titled SUPPORTING DEVICES TO ENHANCE USER COMFORT IN A SEATED POSITION, filed on Oct. 26, 2011, U.S. patent application Ser. No. 13/660,868, titled SUPPORTING DEVICES TO ENHANCE USER COMFORT IN A SEATED POSITION, filed on Oct. 25, 2012, PCT Patent Application No. PCT/US2012/061995, titled SUPPORTING DEVICES TO ENHANCE USER COMFORT IN A SEATED POSITION, filed on Oct. 24, 2012, U.S. patent application Ser. No. 13/874,624, titled SUPPORTING DEVICES TO ENHANCE USER COMFORT IN A SEATED POSITION, filed on May 1, 2013, and U.S. Provisional Patent Application No. 61/845,827, titled SUPPORTING DEVICES TO ENHANCE USER COMFORT IN A SEATED POSITION, filed on Jul. 12, 2013. Each of the foregoing applications is hereby incorporated by reference herein in its entirety.

BACKGROUND

Field

The disclosure generally relates to the field of travel gear, and more particularly, for enhancing user comfort while traveling.

Description of the Related Art

Millions of economy class travelers have a strong desire to sleep on board a plane. The seat inclination for that category of travel is close to 90 degrees. Without proper neck and head support, only a small percentage of people manage to rest during travel. This same challenge faces people on trains, buses, cars, and even office workers that desire a small nap at their work desk.

Several devices attempt to address this problem. One such device is an U-shaped neck pillow. These pillows have achieved high market penetration despite low effectiveness. The U-shaped pillow only provides marginal lateral neck support, and no frontal head support. The devices are rather bulky and often have to be carried separately, which is inconvenient. Although more portable inflatable U-shaped pillows are available, they are less comfortable and equally ineffective in providing frontal head support. Full neck collars are available for improved head support, but these are even more bulky and restrict ventilation around the neck, inducing perspiration.

Tray inflatable pillows are available for use in situations where a food tray is present. These pillows provide decent support by filling up the space between the passenger and the food tray. They require a long time to inflate, however, and place the user in a precarious position where any movement of the neighboring front seat can disturb the sleep. Accordingly, a portable head supporting device that allows a person to rest in a seated position is desirable for travelers.

SUMMARY

Head supporting devices are provided that support a user's head to allow rest while traveling.

According to some embodiments, a head supporting device comprises: an elongate anchor member for positioning between a back of a user and a seat; a first head support member movably coupled to a distal end of the anchor member; a second head support member movably coupled to the distal end of the anchor member; and a flexible band coupled to and extending between distal ends of the first and second head support members.

According to some embodiments, a head supporting device comprises: an anchor member configured to be at least partially sandwiched between a user and a seat; a support apparatus moveably coupled to a distal end of the anchor member, the support apparatus comprising a flexible band coupled to and extending between first and second attachment points of the support apparatus; a collapsed arrangement wherein the first and second attachment points are positioned adjacent to each other; and an expanded arrangement wherein the first and second attachment points are spaced apart a distance greater than in the collapsed arrangement, and wherein the first and second attachment points are positioned further away from the proximal end of the anchor member than in the collapsed arrangement.

Some embodiments provide a head supporting device comprising a first member configured to be at least partially sandwiched between a user and a seat, a support apparatus configured to support a head of the user relative to the first member, and a coupling member configured to couple the support apparatus to the first member, the coupling member further configured to enable repositioning of the support apparatus with respect to the first member.

Some embodiments provide a head supporting device comprising a first member configured to be attached to a seat, a support apparatus configured to support a head of the user relative to the first member, and a coupling member configured to couple the support apparatus to the first member, the coupling member further configured to enable repositioning of the support apparatus with respect to the first member.

Some embodiments provide a head supporting device comprising a first member configured to be at least partially sandwiched between a user and a seat, and a support apparatus coupled to the first member and configured to secure the head of the user relative to the first member.

Some embodiments provide a head supporting device configured to support a head of a user comprising a support apparatus configured to couple to a seat and to secure the head of the user relative to the seat.

Some embodiments provide a head supporting device comprising a chin support member having a first surface configured to at least partially contact a chin of a user; and a chest support member having a second surface configured to at least partially contact a chest of the user, wherein the chin support member is coupled to the chest support member.

For purposes of this summary, certain aspects, advantages, and novel features of the invention are described herein. It is to be understood that not necessarily all such advantages may be achieved in accordance with any particular embodiment of the invention. Thus, for example, those skilled in the art will recognize that the invention may be embodied or carried out in a manner that achieves one advantage or group of advantages as taught herein without necessarily achieving other advantages as may be taught or suggested herein.

BRIEF DESCRIPTION OF THE DRAWINGS

FIG. 16A is a perspective view of a head supporting device integrated with a seat.

FIG. 16B is another perspective view of a head supporting device integrated with a seat.

FIG. 16C is another perspective view of a head supporting device integrated with a seat.

FIGS. 18A and 18B illustrate another embodiment of a head supporting device.

FIGS. 20A and 20B illustrate another embodiment of a head supporting device.

DETAILED DESCRIPTION

Although several embodiments, examples and illustrations are disclosed below, it will be understood by those of ordinary skill in the art that the invention described herein extends beyond the specifically disclosed embodiments, examples and illustrations and includes other uses of the invention and obvious modifications and equivalents thereof. Embodiments of the invention are described with reference to the accompanying figures, wherein like numerals refer to like elements throughout. The terminology used in the description presented herein is not intended to be interpreted in any limited or restrictive manner simply because it is being used in conjunction with a detailed description of certain specific embodiments of the invention. In addition, embodiments of the invention can comprise several novel features and no single feature is solely responsible for its desirable attributes or is essential to practicing the inventions herein described.

The disclosure herein provides supporting devices configured to enhance user comfort in a seated position. Various supporting devices are described that may be used alone or in combination with one or more other supporting devices.

Head Supporting Device

Figure 1:
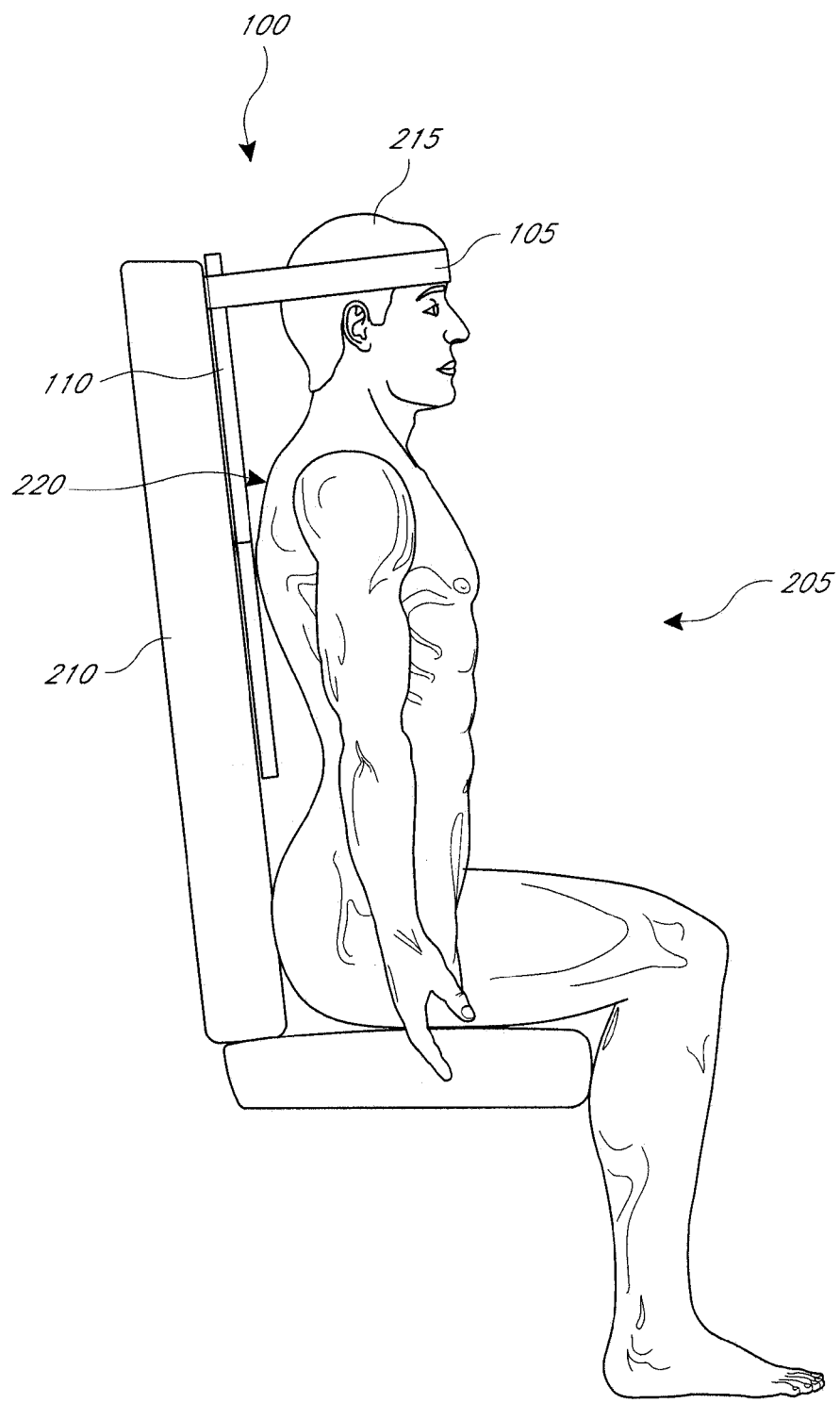
FIG. 1 is a side view of a user using a head supporting device according to an embodiment.

Some embodiments provide a head supporting device 100 that can be used during travel. The device can be configured for use in a seated or upright position, and is configured for supporting the user's head. As shown in FIG. 1, the head supporting device 100 comprises a first member 110 configured to be at least partially sandwiched between a user 205 and a seat 210, and a support apparatus 105 coupled to the first member 110 and configured to secure a head 215 of the user 205 relative to the first member 110.

In some embodiments, the first member 110 is substantially rigid in use, so it can support the head 215 of the user 205 in either leaning forward or leaning back positions. In some embodiments, the first member 110 may be a backplate anchor. The backplate anchor may be positioned between the user's back 220 and the seat 210, and thus anchor or secure the head supporting device 100 in position during use.

In some embodiments, the first member 110 can have a length varying from about 1 cm to about 100 cm and thickness varying from about 1 mm to about 50 mm, depending on the strength of the material. The first member 110 can be made of plastics (e.g., Acetal, Nylon, Polypropylene, etc.), fiber filled plastics, metals, fabrics, or any other material or combination of materials sufficiently rigid to function as described herein.

Figure 2:
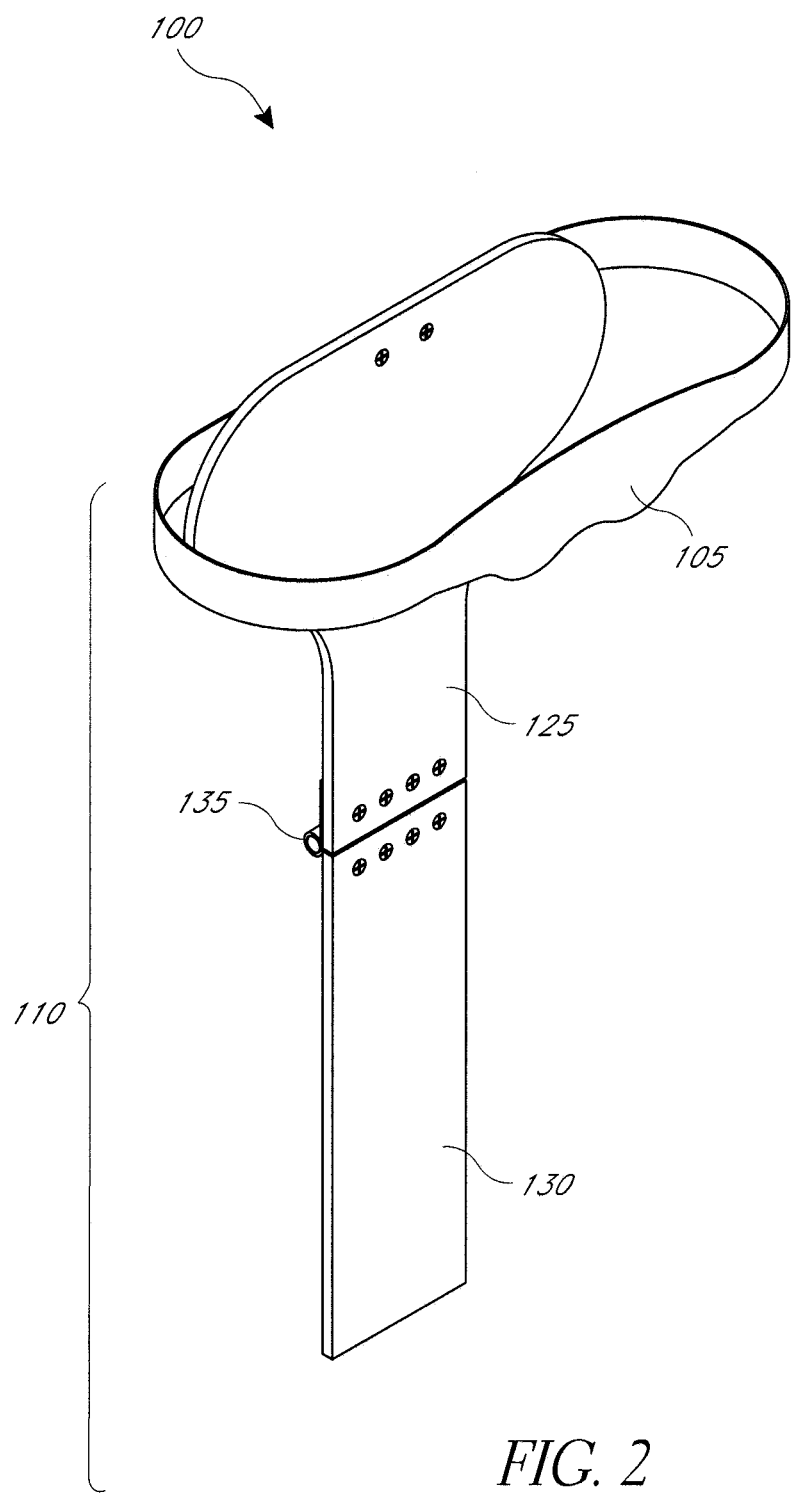
FIG. 2 is a perspective view of the head supporting device of FIG. 1 according to an embodiment.

The first member 110 may be designed to provide comfort to the user. In some embodiments, the backplate anchor may be thin enough that it is barely felt by the user 205. In some embodiments, padding may be added to the first member 110 where the first member 110 is configured to be sandwich between the user and the seat. In some embodiments, the backplate anchor may comprise a cut out at the location where the backplate anchor is to contact the spinal area of the back of the user. In some embodiments, no rigid material is present at the central portion along the longitudinal axis of the first member 110. In some embodiments, the cut out is provided on at least one portion of the backplate anchor. In some embodiments, additional padding may be added to the central portion along the longitudinal axis of the first member 110. In some embodiments, padding may also be added to the portion where the first member will be contacting the head of the user, In some embodiments, the first member 110 has an extended configuration and a collapsed configuration. In some embodiments, the first member 110 may comprise multiple smaller plates that are connected or coupled together through coupling members. With reference to FIG. 2, the first member 110 comprises at least a first portion 125 and a second portion 130. In some embodiments, the first portion 125 may be pivotably coupled to the second portion 130 of the first member 110 through a coupling member 135.

Figure 3:
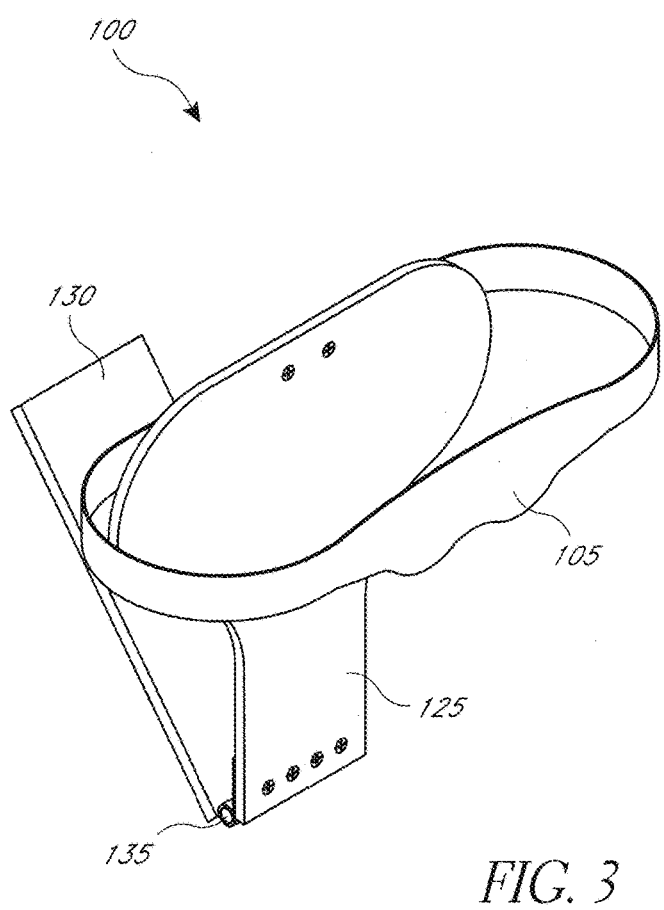
FIG. 3 is a perspective view of the head supporting device of FIG. 1 according to an embodiment.

In some embodiments, the coupling member 135 may be a hinge. The hinge may include a locking mechanism to make the backplate anchor substantially rigid. Alternatively, the hinge may have an end of travel stop, making the backplate anchor substantially rigid only when the first portion 125 is pulled in the direction of the user 205. In some embodiments, the hinge can have a restricted range of motion to ensure that the backplate does not substantially deform once it is placed in the desired position. FIG. 3 shows the head supporting device 100 in a partially collapsed configuration, making the overall size of the head supporting device 100 smaller for easier transportation.

Figure 4:
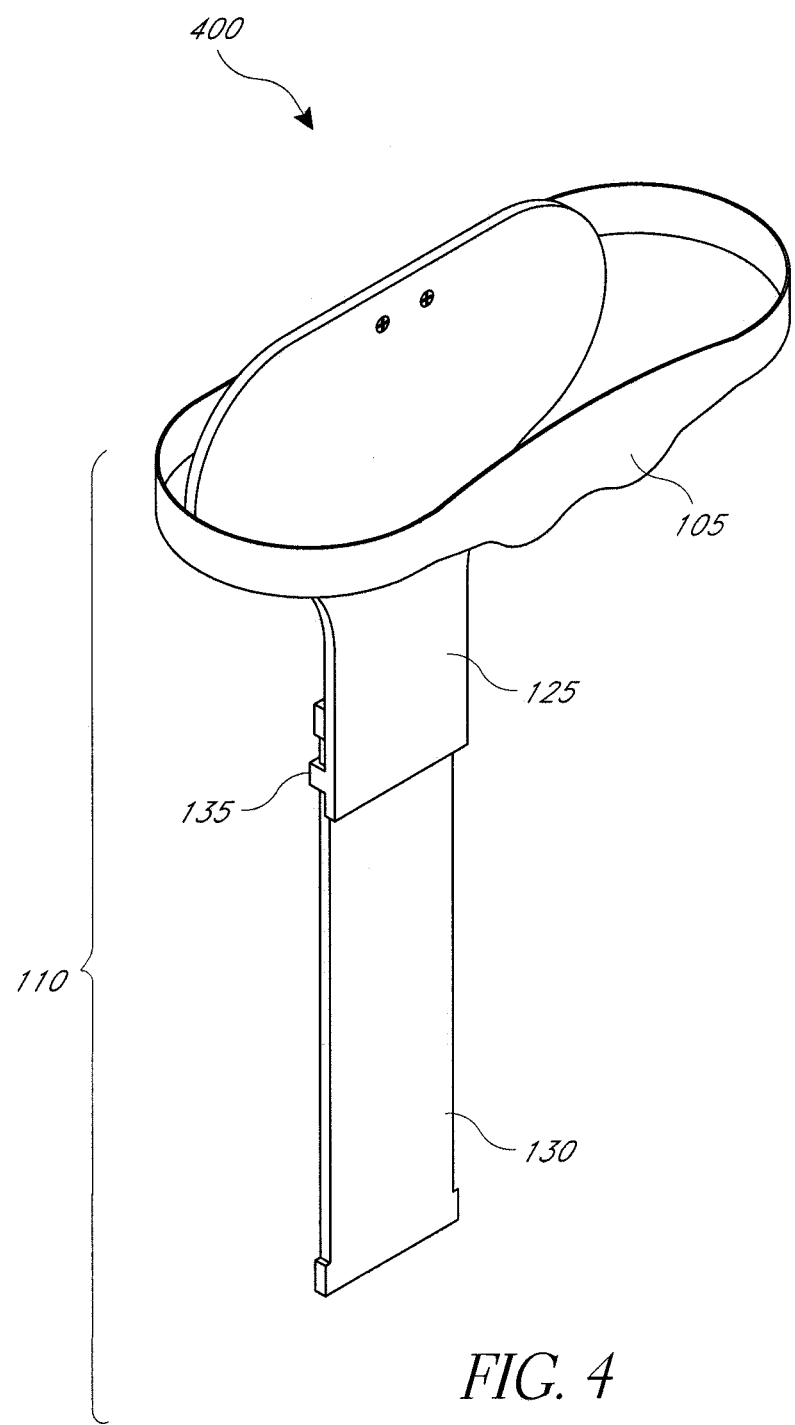
FIG. 4 is a perspective view of a head supporting device according to an embodiment.

In some embodiments, the first portion 125 may be slidably coupled to the second portion 130 as seen in FIG. 4. In some embodiments, the coupling member 135 may be a sliding joint, which enables the first 125 and the second portions 130 to slide toward each other so the two portions are stacked together for storage or easier transportation. In some embodiment, the coupling member 135 may be any type of joint or connector that allows the first member 110 to be collapsed down to a smaller size.

Dividing the first member 110 into smaller pieces serves to reduce the total size of the device for easier storage and portability. In other embodiments, more than two separate plates may be coupled together to allow the first member 110 to collapse to an even smaller overall size.

In some embodiments, the support apparatus 105 may comprise a strap or a headband. The strap or headband can be made of stretchable or non-stretchable fabric materials. For example, nylon or neoprene may be used in at least a portion of the support apparatus 105. In some embodiments, a rigid material or any other material sufficient to support a user's head 215 may also be incorporated into the support apparatus 105. In some embodiments, the at least a portion of the support apparatus 105 may be padded.

In some embodiments, the headband or strap may comprise two loose ends that are configured to be fastened or connected together through a fastening means. The fastening means may be a buckle, a clasp, a Velcro type closure, a hook-and-eye closure, a snap fastener, or a button. In some embodiments, the fastening means also allows adjustment to the strap or headband.

In some embodiments, the strap or headband includes at least one adjuster to allow adjustment to the length or fitment of the support apparatus 105. This may allow the support apparatus to be adjusted to fit various head sizes and to adjust to the most comfortable position for a particular user.

In some embodiments, the support apparatus 105 may incorporate at least one elastic portion between the support apparatus 105 and the first member 110. The elastic portion is stretchable and may allow a certain amount of head movement while a user's head is engaged with the support apparatus 105. In some embodiments, at least one elastic portion is incorporated into the support apparatus 105 where non-stretchable or material with low elasticity is used for the headband or the strap portion. In some embodiments, the head supporting device 100 further comprising two elastic portions or sections between the support apparatus 105 and the first member 110. This may be desirable to keep the user from feeling too constrained when using a head supporting device. In other embodiments, the entire headband or strap may be stretchable.

In some embodiments, the support apparatus 105 may further comprise a sleeping mask, which may be used to cover the eyes of the user and create an atmosphere more conducive to sleep. The sleeping mask can be attached to the headband using a detachable fastener, such as a hook and loop faster or Velcro. Making the sleeping mask easily detachable may make it easier to wash. The sleeping mask can also be perfumed, contain plastic beads, aromatic beads, or other materials conducive to a better sleeping condition.

In some embodiments, a head supporting device 100 may additionally incorporate a padded member positioned between the first member 110 and the user 205. The padded member may be positioned to be sandwiched between the user's head and/or neck and the first member 110. The padded member may be movably coupled to the first member 110. The padded member may be positioned by the user 205 to most effectively support the back of the user's head and/or neck while seated in the seat 210. In other embodiments, the padded member may be detachably coupled to the first member 110, allowing the user to reposition the padded member by detaching it and then reattaching it in a different location. In some embodiments, the padded member may be a pillow or a small padded head rest.

In some embodiments, the padded member may be fixedly attached to the first member 110. To adjust positioning of the padded member, the user would adjust the positioning of the first member 110. In other embodiments, the padded member may be a separate device not attached to the first member 110. In other embodiments, the padded member may be slidably coupled to the backplate anchor, allowing the padded member to slide in one direction with respect to the backplate anchor, such as to adjust for a user's height.

In some embodiments, the head supporting device 100 may further comprises two side support members positioned adjacent to where the support apparatus are attached to the first member 110. In some embodiments, the side support member may include substantially rigid arms extending out from the first member and positioned at both side of the user's head to provide additional lateral support to the user. The substantially rigid arms may be used in combination with the support apparatus 105 for even further lateral and frontal support. In some embodiments, the substantially rigid arms can connect to the first member 110 using a pivotal connector. The pivotal connector may be a hinge, a ball joint, or a simple pin.

In some embodiments, the first member 110 can also include connectors to hold a multitude of gadgets or objects to free up the user's hands. An object may connect directly to the head supporting device, or a support member, such as a supporting arm, may connect the object to the head supporting device. Examples of objects that may be supported are a journal, book, tablet PC, other electronic devices, phone, mirror, fan, video display, cup holder, music player, or alarm clock.

A head supporting device 100 can be used in various different modes. One mode is when a user 205 leans slightly forward and rests his head 215 on the support apparatus 105 (such as a headband) for a good comfortable sleeping or reading position (as shown in FIG. 1). Another mode is when the user leans back on the first member 110 and rests his head 215 on the backplate or a padded member (or headrest) in order to minimize neck strain when, for example, the seat is too low and does not incorporate a headrest. While leaning back against the backplate or padded headrest, the user may optionally adjust the headband to help secure the user's head relative to the backplate or padded member.

FIG. 1 shows the user 205 using the head supporting device 100 in a mode where the user's head 215 is leaning forward onto the support apparatus 105. The user's head 215 exerts a force on the support apparatus 105, which then exerts a force on the first member 110. This creates a momentum that is counteracted by the momentum that originates from a reaction force of the seat 210, allowing the user's head 215 to be supported. In a configuration where a user is resting his or her head on the support apparatus 105, the momentum created by the force exerted by the user's backward-leaning head is counteracted by the momentum created by the reaction force of the user's lumber area over the support apparatus 105.

Friction forces between the user's back 220 and the seat 210 generally keep the first member 110 from moving. In essence the first member 110 is sandwiched between the user 205 and the seat 210 and forms an anchor that can easily support forces of the order of tens of Newtons. The user 205 can adjust the first member 110 up, down, or sideways according to his or her preference. The seated user 205 can additionally personalize the fit of the support apparatus 105 as well as the position of the first member 110 until a comfortable position is reached. The user 205 can also choose to lean sideways into the support apparatus 105 and optimize for a comfortable sleeping position. The user 205 can also choose to lean back and rest his or her head 215 on the first member 110. When the user's head 215 is resting on the first member 110, the support apparatus 105 may optionally be adjusted to hold the user's head 215 against the first member 110 to support the user's head 215 while sleeping or resting.

In some embodiments, a user may adjust the length of the support apparatus 105 using adjusters to configure the head supporting device to meet that user's needs. For example, the user may adjust the support apparatus 105 to be longer so that the user's head 215 is leaning away from the first member 110 and/or padded member while the front of the user's head is supported by the support apparatus 105. The user may alternatively lean his or her head back against the first member 110 and/or padded member without tightening the support apparatus 105 to support the back of the head 215 without any frontal support. In some embodiments, the user may both lean his or her head back into the first member 110 and/or padded member while tightening the support apparatus 105 to provide support to both the front and back of the user's head. In various configurations, the first member 110, padded member, and support apparatus 105 provide lateral support to the user's head in addition to supporting the front and back of the user's head.

Head Supporting Device Coupled to a Seat

Figure 5:
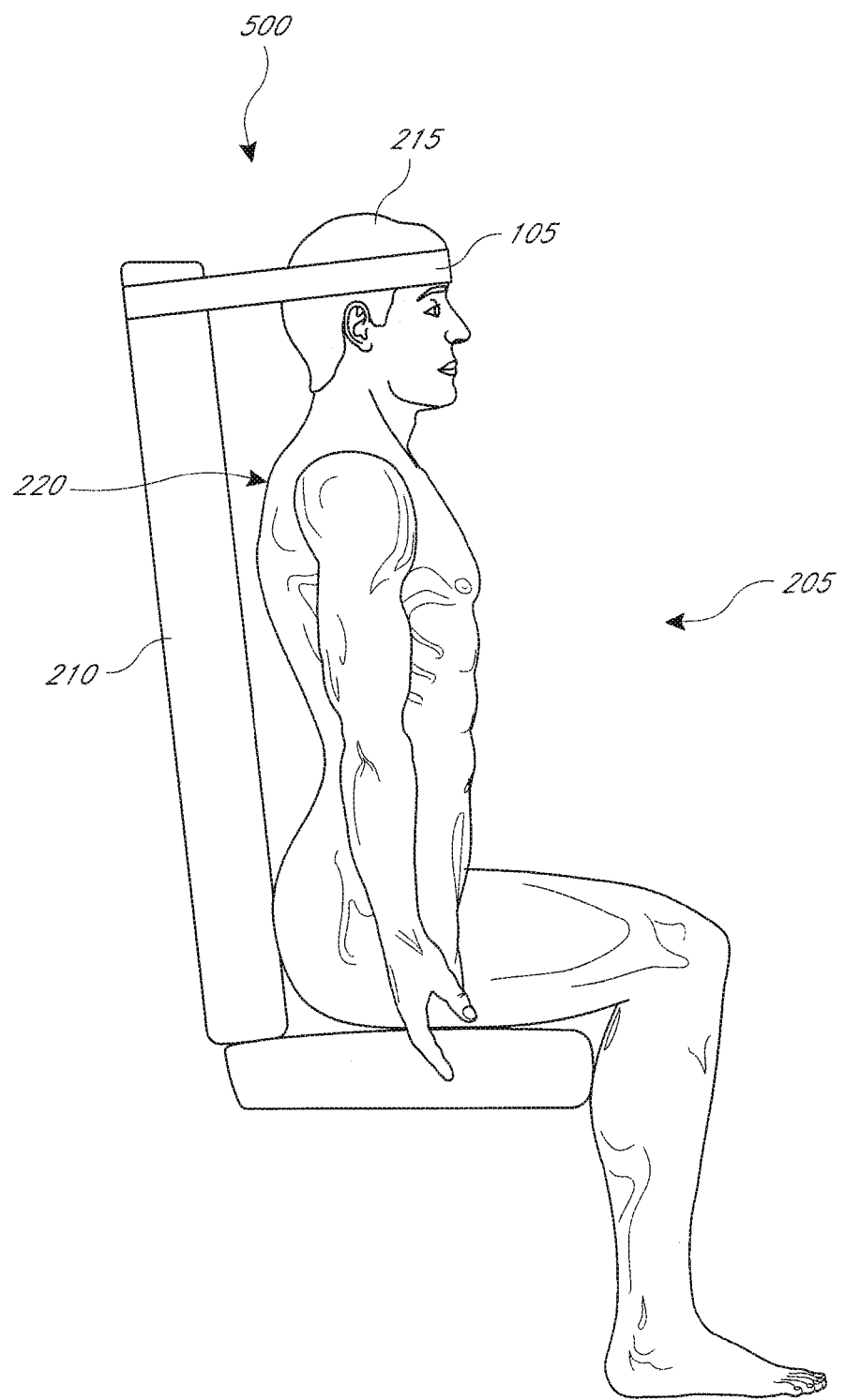
FIG. 5 is a side view of a user using a head supporting device according to an embodiment.

Some embodiments provide a head supporting device 500 that can be coupled or integrated to a seat. As shown in FIG. 5, the head supporting device 500 comprises a support apparatus 105 configured to couple to a seat 210 and to secure the head 215 of the user relative to the seat 210. The support apparatus 105 may be solidly secured to the seat 210 through a permanent or temporary attachment.

In some embodiments, the support apparatus 105 can couple to the seat 210 by wrapping around the backrest of the seat 210. In some embodiments, a seat strap may be used to provide anchoring points or attachment points for coupling to the support apparatus 105. The support apparatus 105 then can be coupled to the seat 210 indirectly through attachment to the seat strap. For example, the seat strap may be strapped around the upper seatback and provide attachment areas or anchors for the support apparatus 105 to be securely coupled to the strap.

In some embodiments, the support apparatus 105 can be directly attached to the seatback or the seat strap that has been strapped around the seatback. For example, Velcro type attachment at the attachment point(s) may be used to secure the support apparatus to the seat 210 or seat strap. In some embodiments, the support apparatus 105 may have two attachment ends for coupling to the seat directly or through the seat strap. In other embodiments, the support apparatus 105 may form a loop, and at least one attachment point is provided on the loop for coupling to the seat or the seat strap.

In other embodiments, the support apparatus 105 may be anchored into the seatback or the cushion of the headrest. Some seatback or headrests may optionally provide appropriate anchoring location or anchor points for such attachment. A large clamp secured to the headrest can also be used as an anchor for the support apparatus 105.

In some embodiments, the support apparatus 105 may be coupled to the headrest of the seat 210. The support apparatus 105 may further comprise two looped attachment ends that can be strapped onto both sides of the headrest on the seat 210. The looped attachment ends may also be adjustable for secured attachment. Any suitable mechanisms that allow the support apparatus 105 to be coupled to the headrest are within the scope of the embodiments.

In some embodiments, the support apparatus 105 may be integrated into a seat 210, such as seats with high back or with headrest. The support apparatus 105 can be attached to the seat 210 at a location suitable for engaging the head of the user at a seated position. In some embodiments, the support apparatus 105 is attached or coupled directly to a headrest of the seat 210. In some embodiments, the support apparatus 105 is coupled or attached to the seat 210 through a mechanism that allows the position of the support apparatus 105 to be adjusted. For example, the support apparatus 105 may be slidably coupled to the seat back at or near the headrest, so the user may slide the support apparatus 105 up or down depending on the location of the user's head.

In some embodiments, the support apparatus 105 may comprise a strap or a headband. The strap or headband can be made of stretchable or non-stretchable fabric materials. For example, nylon or neoprene may be used in at least a portion of the support apparatus 105. In some embodiments, a rigid material or any other material sufficient to support a user's head 215 may also be incorporated into the support apparatus 105. In some embodiments, at least a portion of the support apparatus 105 may be padded.

In some embodiments, the headband or strap may comprise two loose ends that are configured to be fastened or connected together through a fastening means. The fastening means may be a buckle, a clasp, a Velcro type closure, a hook-and-eye closure, a snap fastener, or a button. In some embodiments, the fastening means also allows adjustment to the strap or headband.

In some embodiments, the strap or headband includes at least one adjuster to allow adjustment to the length or fitment of the support apparatus 105. This may allow the support apparatus 105 to be adjusted to fit various head sizes and to adjust to the most comfortable position for a particular user.

In some embodiments, the support apparatus 105 may incorporate at least one elastic portion that may allow a certain amount of head movement while a user's head is engaged with the support apparatus 105. In some embodiments, at least one elastic portion is incorporated into the support apparatus 105 where non-stretchable or material with low elasticity is used for the headband or the strap portion. In some embodiments, the head supporting device 100 further comprising two elastic portions or sections between the support apparatus 105 and the seat 210. This may be desirable to keep the user from feeling too constrained when using a head supporting device. In other embodiments, the entire headband or strap may be stretchable.

In some embodiments, the support apparatus 105 may further comprise a sleeping mask, which may be used to cover the eyes of the user and create an atmosphere more conducive to sleep. The sleeping mask can be attached to the headband using a detachable fastener, such as a hook and loop fastener or Velcro. Making the sleeping mask easily detachable may make it easier to wash. The sleeping mask can also be perfumed, contain plastic beads, aromatic beads, or other materials conducive to a better sleeping condition.

In some embodiments, the head supporting device 500 may further comprise a padded member coupled to the support apparatus 105, wherein the padded member is configured to be at least partially sandwiched between the user 205 and the seat 210. In some embodiments, the padded member is not coupled to the support apparatus 105, and the padded member and support apparatus 105 are separate devices used together by a user.

Adjustable Head Supporting Device

In some embodiments, an adjustable or shapeable head supporting device is provided. A head supporting device may be configured to be adjustable to enable, for example, adjusting the device to the shape of a seat. For example, some airline seats include a protruding headrest that could cause a head supporting device having a straight, non-adjustable backplate anchor, to push a user's head forward into an uncomfortable position. A head supporting device may also be shapeable to conform to a user's unique body shape and or to his or her preferred seating position. Some users may be more comfortable in different seating positions than other users. Therefore, allowing a head supporting device to be adjustable or shapeable to conform to a user's preferred seating position can be desirable.

Figure 10:
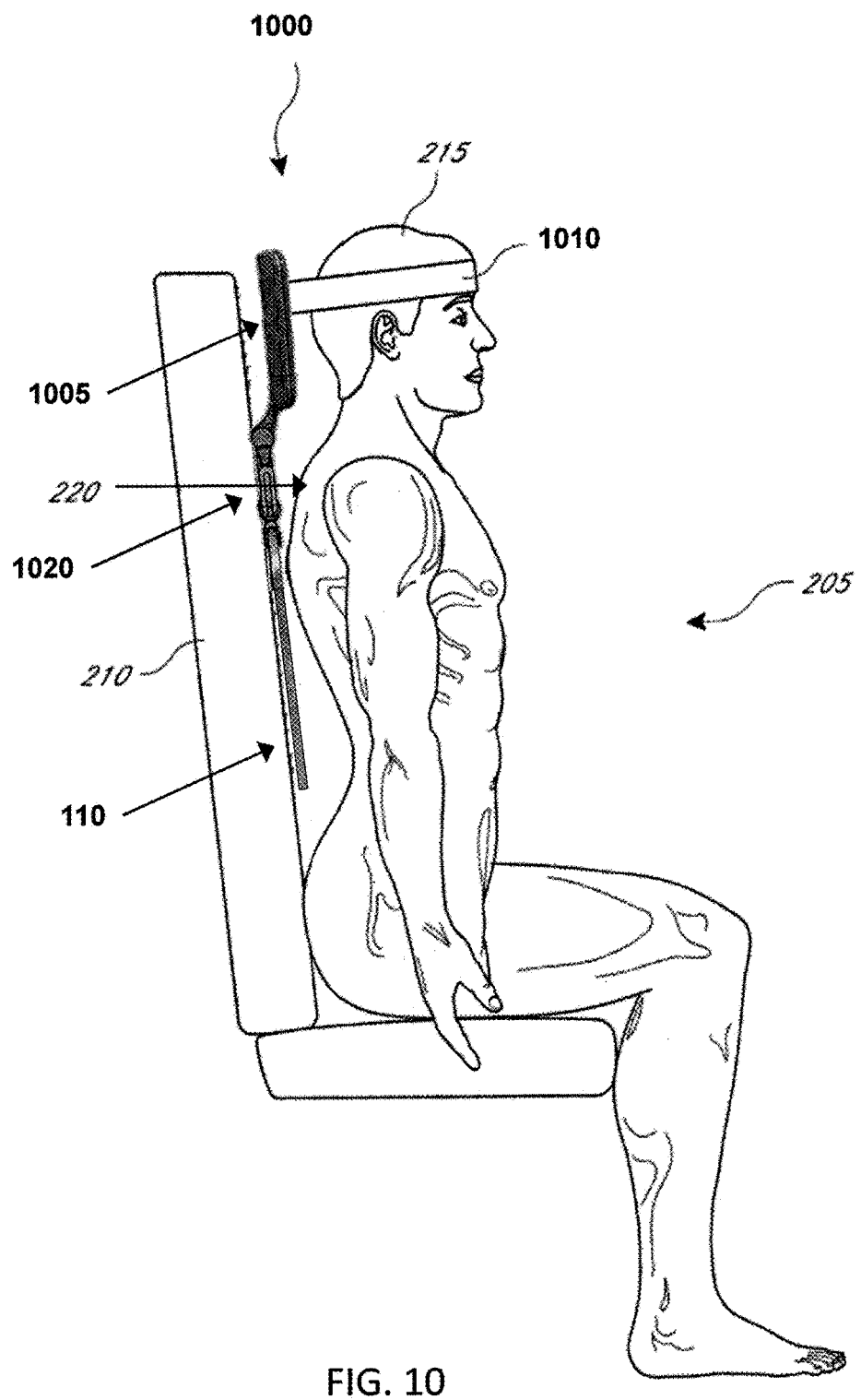
FIG. 10 is a side view of a user using a head supporting device according to an embodiment.
Figure 11:
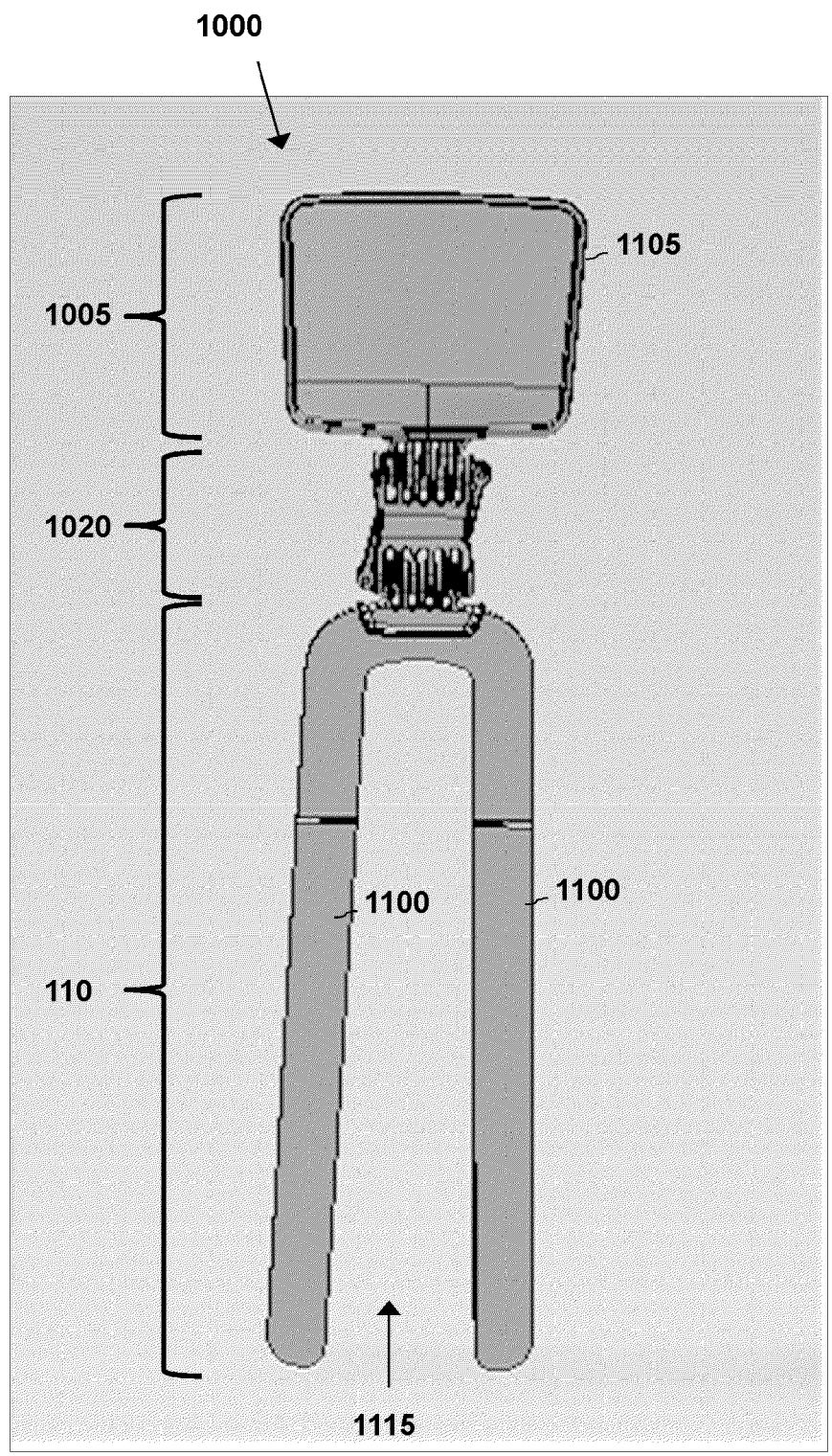
FIG. 11 is a front view of the head supporting device of FIG. 10 according to an embodiment.

FIG. 10 illustrates a side view of an embodiment of an adjustable head supporting device 1000 in use with a user 205. FIG. 11 illustrates a front view of the head supporting device 1000. In this embodiment, the head supporting device 1000 comprises a support apparatus 1005, a coupling member 1020, and a first member 110. In this embodiment, the coupling member 1020 couples the support apparatus 1005 to the first member 110. The coupling member 1020 enables the support apparatus 1005 to be adjusted, positioned, or repositioned with respect to the first member 110. Similar to the head supporting device 100 illustrated in FIG. 1, the head supporting device 1000 is configured to have the first member 110 sandwiched between the back 220 of the user and to act as a backplate anchor for the support apparatus 1005. In this embodiment, the coupling member is approximately 2 inches long and is configured to not be in contact with the user's back. However, in other embodiments, the coupling member may be various lengths and may or may not be configured to be in contact with the user during use. In some embodiments, the support apparatus 1005 comprises a strap or headband 1010 configured to at least partially secure the user's head 215 with respect to the support apparatus 1005 and/or the first member 110.

In the embodiment illustrated in FIG. 10, the seat 210 has a generally straight shape and no protruding headrest. Therefore, the head supporting device 1000 is illustrated in a relatively straight configuration. However, as illustrated in FIG. 14B, the head supporting device 1000 can be adjusted using joints of the coupling member 1020 to position or reposition the support apparatus 1005. For example, as shown in FIG. 14B, the head supporting device 1000 has been adjusted to, for example, make room for or conform to a protruding headrest of a seat.

As illustrated in FIG. 11, the first member 110 of the head supporting device 1000 comprises two legs 1100 separated by a gap 1115. The legs 1100 in this embodiment are relatively thin and configured to at least partially conform to a shape of a user's back. Utilizing relatively thin legs 1100 can be advantageous over utilizing a solid backplate anchor, as illustrated in FIG. 2, because the legs 1100 may be more comfortable for the user. The legs 1100 can comprise, for example, an aluminum alloy configured to be light and thin but still strong enough to perform the functions described herein. The legs 1100 can comprise various other materials, however, as long as the material is sufficient to perform the functions of the first member 110 as described herein. In some embodiments, the legs 1100 are about one inch in width and about 0.09 inches in thickness or less than 0.09 inches in thickness and are separated by a gap 1115 of approximately 2 to 3 inches.

As shown in the embodiment illustrated in FIG. 11, the support apparatus 1005 of the head supporting device 1000 comprises a base portion 1105. In some embodiments, the support apparatus 1005 further comprises a padded member or pillow or cushion configured to be positioned between the base portion 1105 and the back of a user's head. An example of a padded member or pillow can be seen in FIG. 15A. In some embodiments, the strap 1010 is attached to the base portion 1105. In some embodiments, as further illustrated in FIGS. 15A and 15B, the strap 1010 is configured to be detachable at least one end from the base portion 1105.

Figure 12:
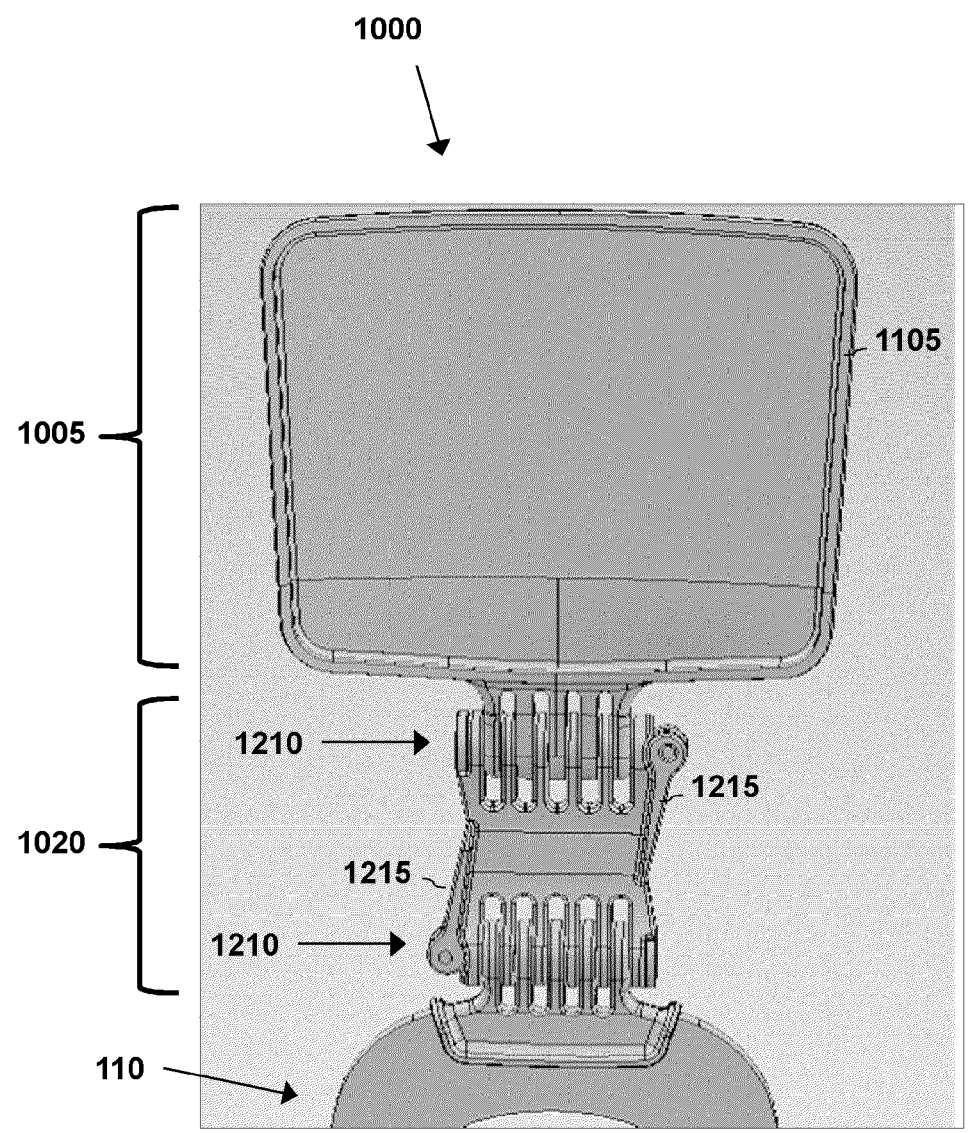
FIG. 12 is a front view of a support apparatus and coupling member of the head supporting device of FIG. 10 according to an embodiment.

FIG. 12 illustrates a front view of the support apparatus 1005 and coupling member 1020 of the head supporting device 1000. In this embodiment, the coupling member 1020 comprises two joints 1210 configured to enable the support apparatus 1005 to be adjusted with respect to the coupling member 1020 and the first member 110. One of the joints 1210 is configured to couple the support apparatus 1005 to the coupling member 1020. The other joint 1210 is configured to couple the first member 110 to the coupling member 1020. Each of the joints 1210 comprises a lever 1215 configured to lock or unlock the joints 1210. Each of the joints 1210 has a locked state and an unlocked state. In the unlocked state, the joint is configured to allow the support apparatus 1005 and/or the first member 110 to be moved or adjusted with respect to the coupling member 1020. In the locked configuration, the joints 1210 are configured to be stiff enough or to have sufficient rigidity to enable the support apparatus 1005 to support the user's head with respect to the first member 110, as described herein. In use, a user can rotate one or both of the levers 1215 to unlock one or both of the joints 1210. Then, when the user has positioned, repositioned, or shaped the head supporting device to a desirable shape or position, the user can rotate the levers 1215 to the locked position, to lock the head supporting device in the current shape or position.

Figure 13:
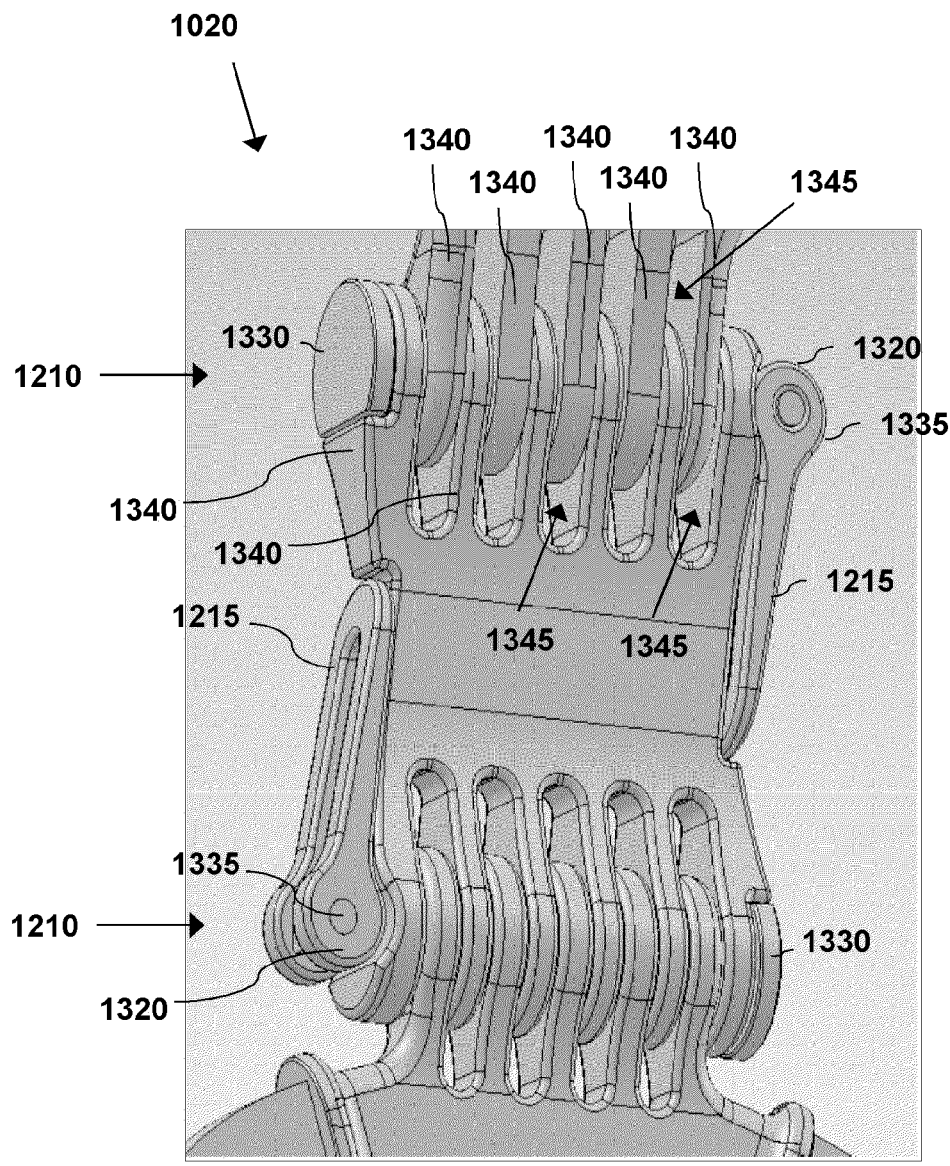
FIG. 13 is a perspective view of a coupling member of the head supporting device of FIG. 10 according to an embodiment.

FIG. 13 illustrates a perspective view of the coupling member 1020 showing more details of the joints 1210. In this embodiment, the joints 1210 each comprise a first half and a second half. For example, the first half may connect to the support apparatus 1005 or the first member 110 while the second half connects to the coupling member 1020. Each of the halves of the joints 1210 comprises a plurality of fingers (or arms or protruding members) 1340 separated by interstitial spaces 1345. The fingers 1340 of one half of the joint 1210 are configured to mesh with the fingers 1340 of the other half of the joint 1210. The fingers 1340 are configured to mesh along an axis of rotation of the joint 1210 defined by an axis of a shaft 1330. The shaft 1330 is configured to pass through a hole in each of the fingers 1340 and to engage the lever 1215 at an opposite end of the joints 1210. The lever 1215 engages the shaft 1330 using a pin 1335 passing through both the lever 1215 and the shaft 1330.

In this embodiment, the lever 1215 is configured to rotate around the pin 1335 to alternate the joint 1210 between the locked and unlocked states. The lever 1215 comprises a cam 1320 adjacent to a mating surface of one of the fingers 1340. The cam 1320 is configured to apply a locking force along the axis of rotation of the joint 1210 to the mating surface of the finger 1340 when the lever is in the locked configuration. This locking force is configured to be sufficient to force the various fingers 1340 against each other, creating a friction force sufficient to stop the joint 1210 from rotating when the head supporting device 1000 is being used to support a user's head. When a lever 1215 is rotated away from the coupling member 1020, the cam 1320 is configured to lessen or reduce the force applied to the mating finger 1340 to reduce or eliminate the friction force between the fingers 1340 of the two halves of the joint 1210. By reducing or eliminating the friction force, the two halves of the joint 1210 can be rotated with respect to each other to enable shaping, positioning, or repositioning of the head supporting device 1000.

While the embodiment of a head supporting device illustrated in FIGS. 10 through 15B illustrates a coupling member 1020 utilizing two pivot joints each configured to enable one degree of rotational freedom of motion, an adjustable head supporting device may be configured to be adjustable in various other ways. For example, a coupling member may utilize one or more (or a combination of) hinge joints, pivot joints, sliding joints, ball and socket joints, flexible materials, such as a relatively rigid but deformable material such as malleable metal, and/or the like. Additionally, while the embodiment of a head supporting device 1000 illustrated in these figures comprises joints 1210 having locked and unlocked configurations, a head supporting device may in some embodiments comprise one or more joints that, rather than needing to be unlocked to be adjusted, have a certain preload force. In these embodiments, the user merely needs to overcome that preload force to adjust or position the joint.

Figure 14A:
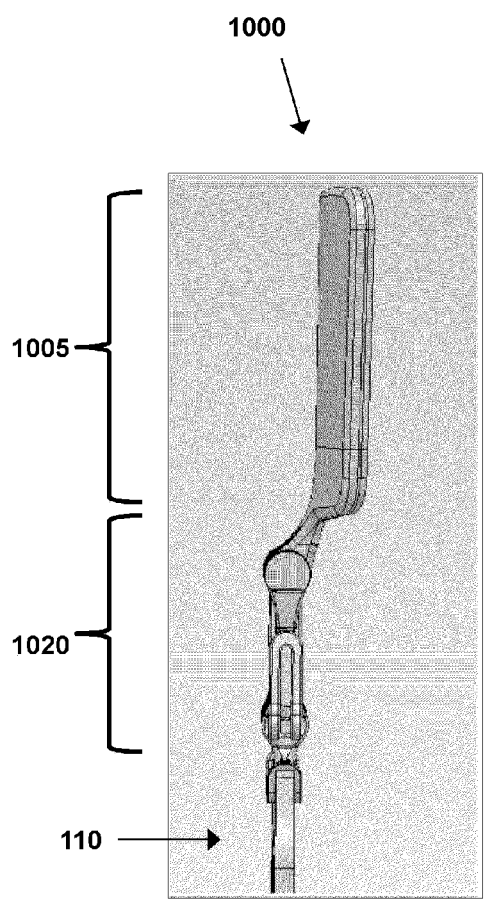
FIG. 14A is a side view of the head supporting device of FIG. 10 according to an embodiment.
Figure 14B:
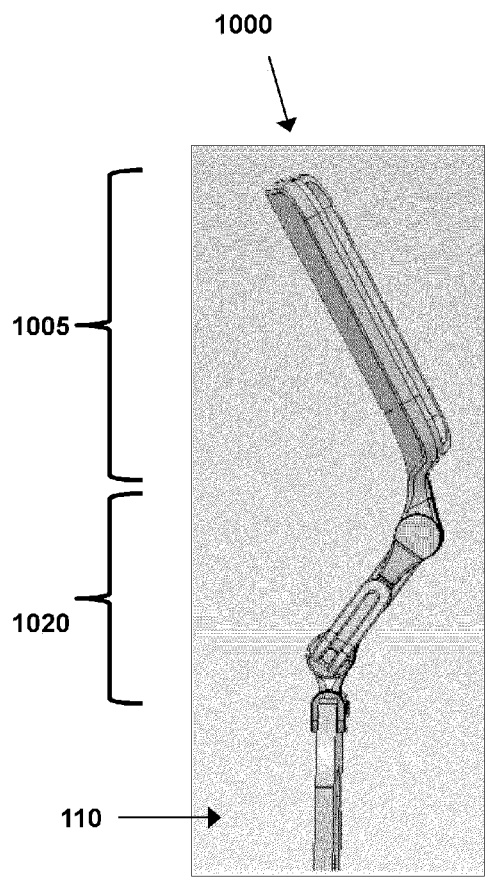
FIG. 14B is a side view of the head supporting device of FIG. 10 according to an embodiment.

FIGS. 14A and 14B illustrate side views of an embodiment of the head supporting device 1000 in two different configurations. The configuration shown in FIG. 14A is similar to the configuration shown in FIG. 10. This configuration may be advantageous, for example, when a seat does not have a protruding headrest. FIG. 14B illustrates the head supporting device 1000 shaped or adjusted differently, for example, to be shaped around a protruding headrest of a seat or simply to be shaped in a more comfortable position for the user. Although FIGS. 14A and 14B illustrate two configurations or shapes of the adjustable head supporting device 1000, the head supporting device 1000 may be shaped in any way that is comfortable for the user.

Figure 15A:
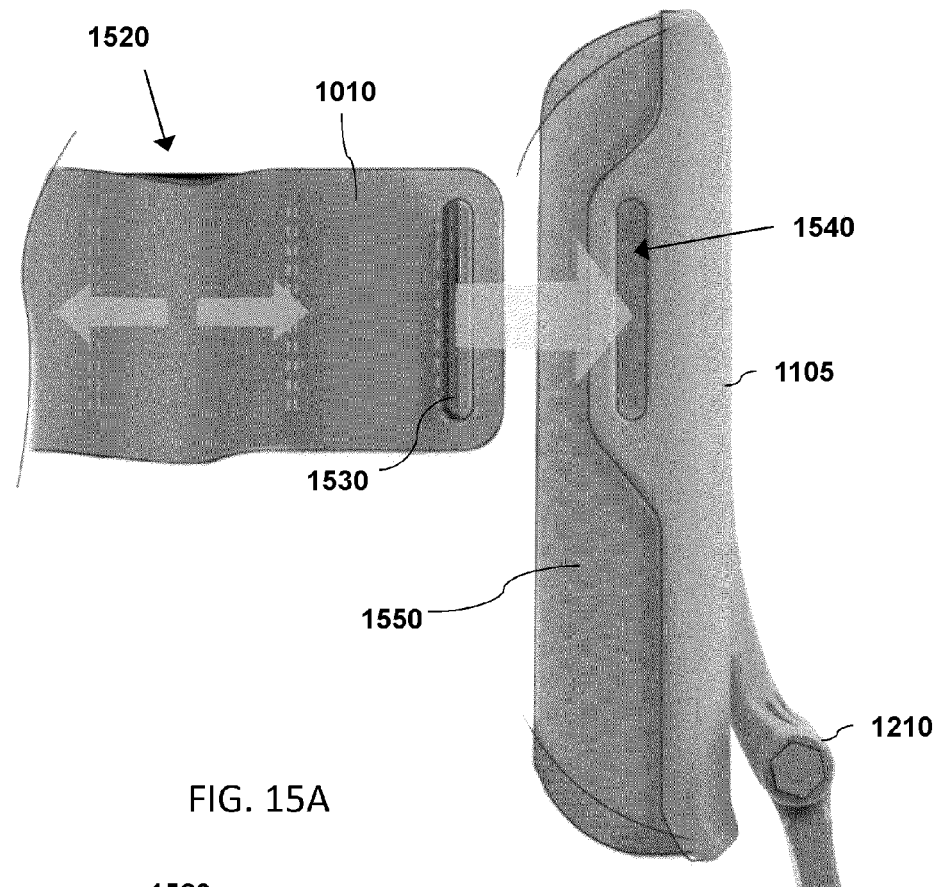
FIG. 15A is an exploded view of a support apparatus of a head supporting device according to an embodiment.
Figure 15B:
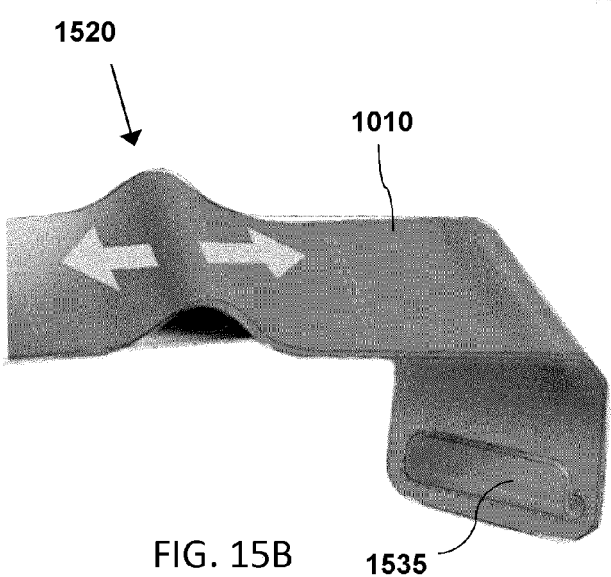
FIG. 15B is a perspective view of a strap of the support apparatus of FIG. 15A according to an embodiment.

FIGS. 15A and 15B illustrate additional details of an embodiment of a support apparatus 1005. FIG. 15A illustrates an exploded view of a support apparatus 1005 comprising a base portion 1105, a padded member or pillow or cushion 1550 attached to the base portion 1105, and a strap 1010 configured to be releasably attached to the base portion 1105. A releasably attached strap 1010 can be an advantageous and/or convenient embodiment of a support apparatus 1005 that can enable a user to detach himself or herself from the head supporting device without having to reach behind himself or herself to remove the entire back support. In some embodiments, the strap 1010 is configured to be detachable at both ends of the strap 1010. In other embodiments, the strap 1010 is configured to be relatively permanently attached to the base portion 1105 at one end, but releasably attached at the other end.

FIG. 15B illustrates a perspective view of the strap 1010 showing a hook or buckle 1535 configured to engage a slot 1540 of the base portion 1105. The strap 1010 additionally comprises a handle 1530 to help the user connect and/or disconnect the strap 1010 from the base portion 1105. FIGS. 15A and 15B additionally illustrate an elastic portion 1520 of the strap 1010. It can be advantageous to have a strap be stretchable to prevent a user from feeling tethered and/or trapped. An elastic portion 1520 can be configured to enable the strap 1010 to stretch by a predetermined amount. In some embodiments, an elastic portion 1520 can be configured to allow an overall or full length of the strap 1010 to stretch by about 5% to about 8%. In other embodiments, one or more elastic portions can be configured to allow an overall or full length of the strap 1010 to stretch less or more than 5% or 8%.

Additional Head Supporting Devices Coupled to a Seat

In further embodiments, a head restraining or supporting device is integrated as part of a seat and/or can be configured to couple to a portion that is integrated as part of the seat. The seat can be, for example, an airplane passenger seat, a commuter train seat, an office seat, or any other type of seat that comprises a backrest.

In some embodiments, a head restraining or supporting device is integrated in a seat's backrest or headrest by providing a tethering location for a headband to be inserted. For example, FIG. 16A illustrates one embodiment of a seat 210 comprising two headband tethering assemblies 1602. Each of the tethering assemblies 1602 comprises a pin 1603 for attachment thereto of a headband. Tethering of a headband or other head supporting apparatus to a seat can also or alternatively be done using Velcro or any other temporary or permanent attachment method.

The example illustrated in FIG. 16A may be limited in its application since, in some embodiments, the tethering assemblies 1602 are integrated into the seat 210 and not adjustable, and therefore may only work for people having a height within a certain range. Accordingly, in some embodiments, multiple locations for tethering the headband are available on the backrest or headrest to accommodate users of different heights. It is also possible, for example, to place the tethering assemblies on a track (for example, a track recessed into the backrest or headrest) to allow for height adjustment. For example, FIG. 16B illustrates an embodiment comprising a seat 210 having two height adjustment tracks or rails 1605 embedded or recessed within the backrest or headrest. Each of the height adjustment tracks 1605 is coupled to a tethering assembly 1604 that is configured to slide (for example, up and down) within the tracks 1605 to enable height adjustment. The tracks 1605 and/or tethering assemblies 1604 may in some embodiments comprise a locking mechanism configured to lock the tethering assemblies 1604 in a particular relative position with respect to the tracks 1605. In some embodiments, the tracks or rails 1605 may comprise a friction-based fit that enables a user to slide an assembly with respect to the tracks 1605, and the assembly will remain in place with respect to the track until an adequate force that overcomes the friction force is applied. In some embodiments, the two tethering assemblies 1604 are linked or connected together, such that moving one of the tethering assemblies 1604 causes a corresponding movement of the other tethering assembly 1604. In this and other embodiments described herein, less than or more than two tethering assemblies may be utilized.

In some embodiments, for example, as shown in FIG. 16C, a support apparatus 1608 may be configured to releasably attach to or be integrated into a backrest or headrest of a seat 210, rather than simply providing tethering locations for attachment thereto of a headband or other head supporting assembly. In some embodiments, the support apparatus 1608 shown in FIG. 16C may be similar to the support apparatus illustrated in FIG. 15A, comprising a base portion 1105 and padded member 1550. In the embodiment illustrated in FIG. 16C, the support apparatus 1608 comprises four attachment points 1606 which are configured to attach or couple the support apparatus 1608 to the seat 210. In some embodiments, the attachment points 1606 are relatively permanent attachments, such as screws, adhesive, stitching, and/or the like. In some embodiments, the attachment points 1606 are configured to be releasable, such as by using, for example, hook and loop fasteners, buttons, magnets, and/or the like. Further, in various other embodiments, more or less attachment points 1606 may be utilized.

Figure 16E:
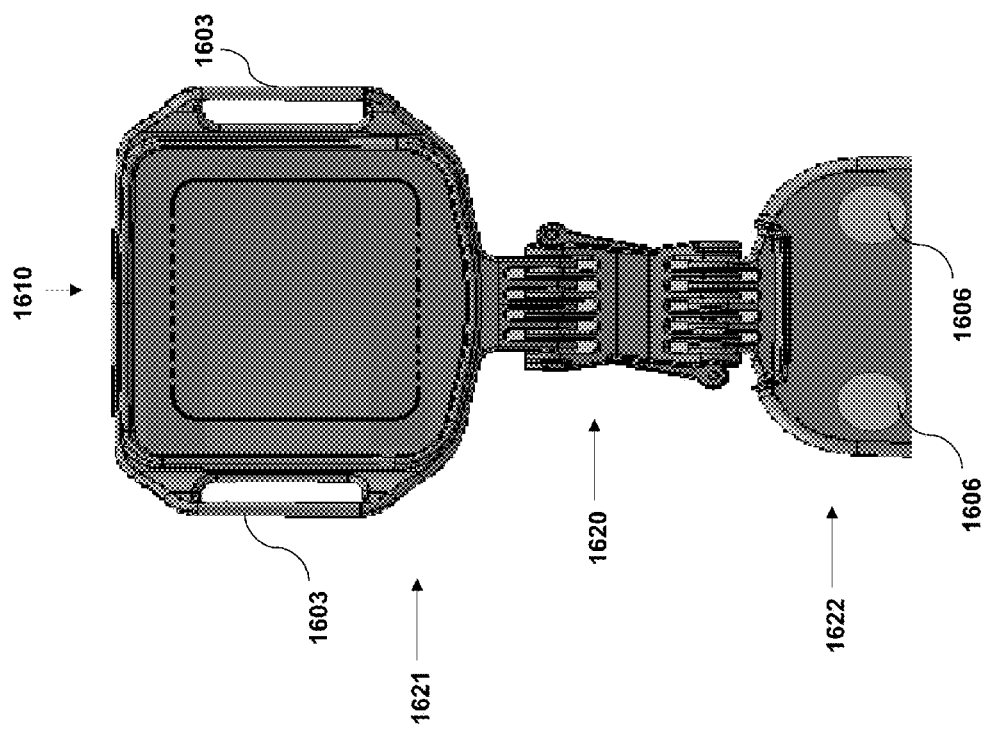
FIG. 16E is a front view of the head supporting device of FIG. 16D.
Figure 16D:
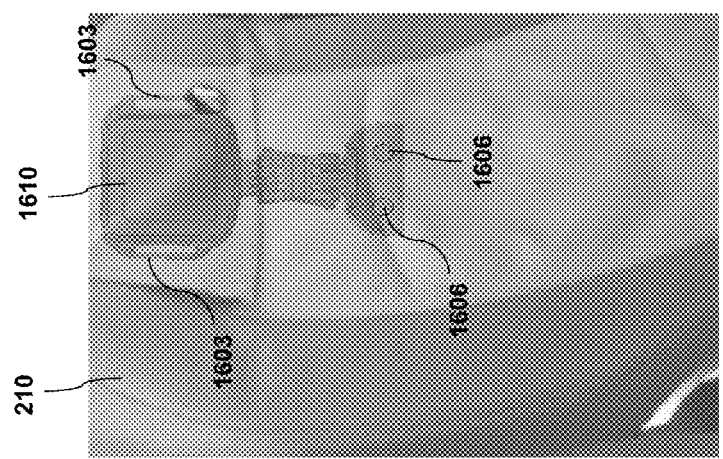
FIG. 16D is a perspective view of a head supporting device integrated with a seat and a front view of the head supporting device.

FIG. 16D illustrates an additional embodiment of a head restraining or supporting device 1610 integrated into or attached to a seat 210. FIG. 16E illustrates an enlarged view of the head restraining or supporting device 1610. Similarly to the embodiment illustrated in FIG. 16C, the head supporting device 1610 is attached or coupled to the seat 210 using attachment points 1606. In this case, two attachment points 1606 are utilized, instead of four. The head supporting device 1610 comprises an articulation or coupling mechanism 1620 that enables a first portion 1621 to be located away from and to move with respect to a base portion 1622. Such a design may be desirable to increase flexibility of the design and also to enable the addition of a headrest or head support to a seat that may not include a headrest, or that may have a lower headrest than is desired by users over a certain height. The head supporting device 1610 may be similar to the head supporting device 1000 shown in FIG. 11, described in greater detail above, but utilizing the base portion 1622 of FIG. 16E instead of the first member 110 of FIG. 11.

Figure 16G:
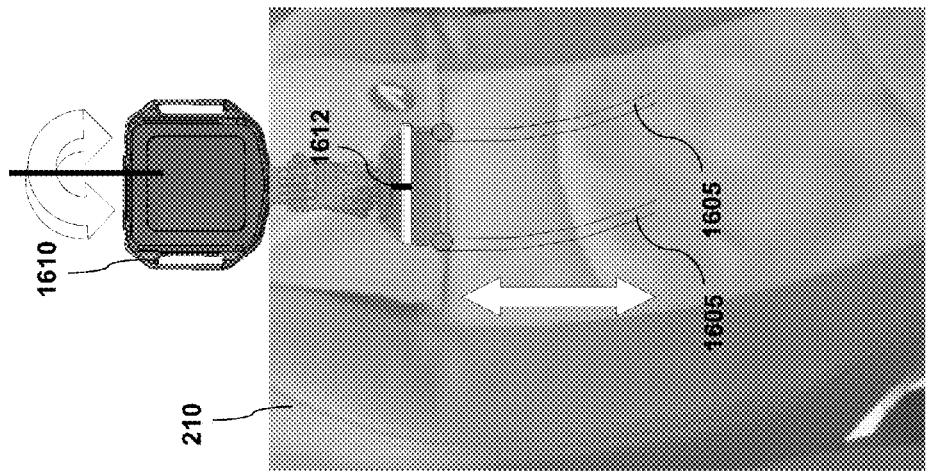
FIG. 16G is another perspective view of a head supporting device integrated with a seat.
Figure 16F:
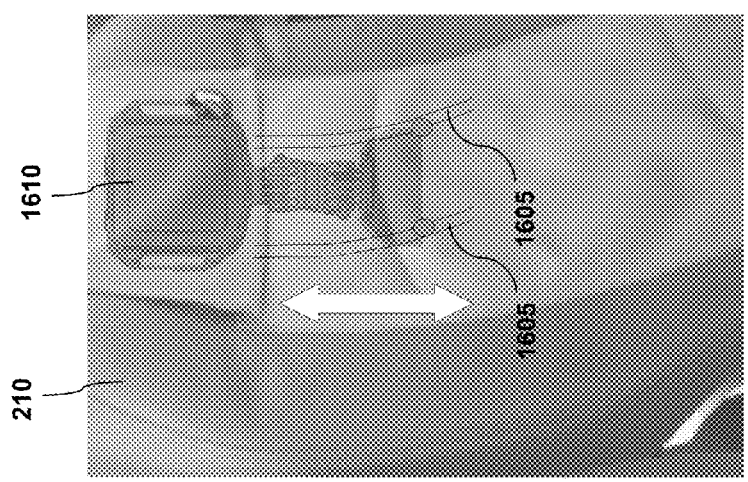
FIG. 16F is a perspective view of a head supporting device integrated with a seat.

FIG. 16F illustrates an alternative embodiment wherein the head supporting device 1610 is attached to the seat 210 using sliding rails 1605, similar to as shown in FIG. 16B. Such an embodiment may be desirable, for example, to enable additional flexibility in positioning of the head supporting device 1610. FIG. 16G illustrates an alternative embodiment that adds even more flexibility and/or convenience to the positioning of the head supporting device 1610. The embodiment illustrated in FIG. 16G is similar to the embodiment illustrated in FIG. 16F. In FIG. 16G, however, the head supporting device 1610 further comprises a pivoting joint or connection 1612 that allows at least one additional degree of freedom in adjusting the head supporting device 1610. In some embodiments, the pivot joint 1612 may be part of the head supporting device 1610. In other embodiments, the pivot joint 1612 may be part of the seat 210 or a bracket or connecting member between the head supporting device 1610 and the seat 210. In some embodiments, the pivoting connection 1612 permits an additional degree of freedom (in some embodiments, limited to a predefined range), for example, to enable the user to turn his or her head left or right (in some embodiments, only slightly left or slightly right). In some embodiments, the pivoting connection can comprise, for example, a friction connection, a lockable pivot, and/or the like.

Additional Head Supporting Device Embodiments

Various embodiments disclosed herein comprise head supporting devices configured to be positioned between a user and a seat and to enable a headband or strap to extend from behind the user's head and wrap around a front of the user's head to prevent the user's head from leaning too far forward. Such designs may be configured to provide at least some lateral or sideways support to the head, too. However, in some embodiments, it can be desirable to have additional and/or more effective lateral or sideways support. Accordingly, in some embodiments, a head supporting device comprises one or more head supporting members configured to position headband attachment points away from the seat back and/or closer to a user's head. In some embodiments, headband attachment points are positioned far enough forward with respect to the seat back to be at least partially beside or lateral to a user's head rather than behind the user's head.

For example, a head supporting device may comprise two supporting members or arms, with distal ends of the arms being positioned adjacent to the left and right sides of the user's head, respectively, and having a headband connected to and extending therebetween. In some embodiments, the arms may be coupled at a proximal end to a backplate anchor positioned behind the user. The arms may, for example, extend upwardly and outwardly from a joint portion of the anchor. This configuration may provide better lateral or sideways support than some other embodiments.

Figure 17A:
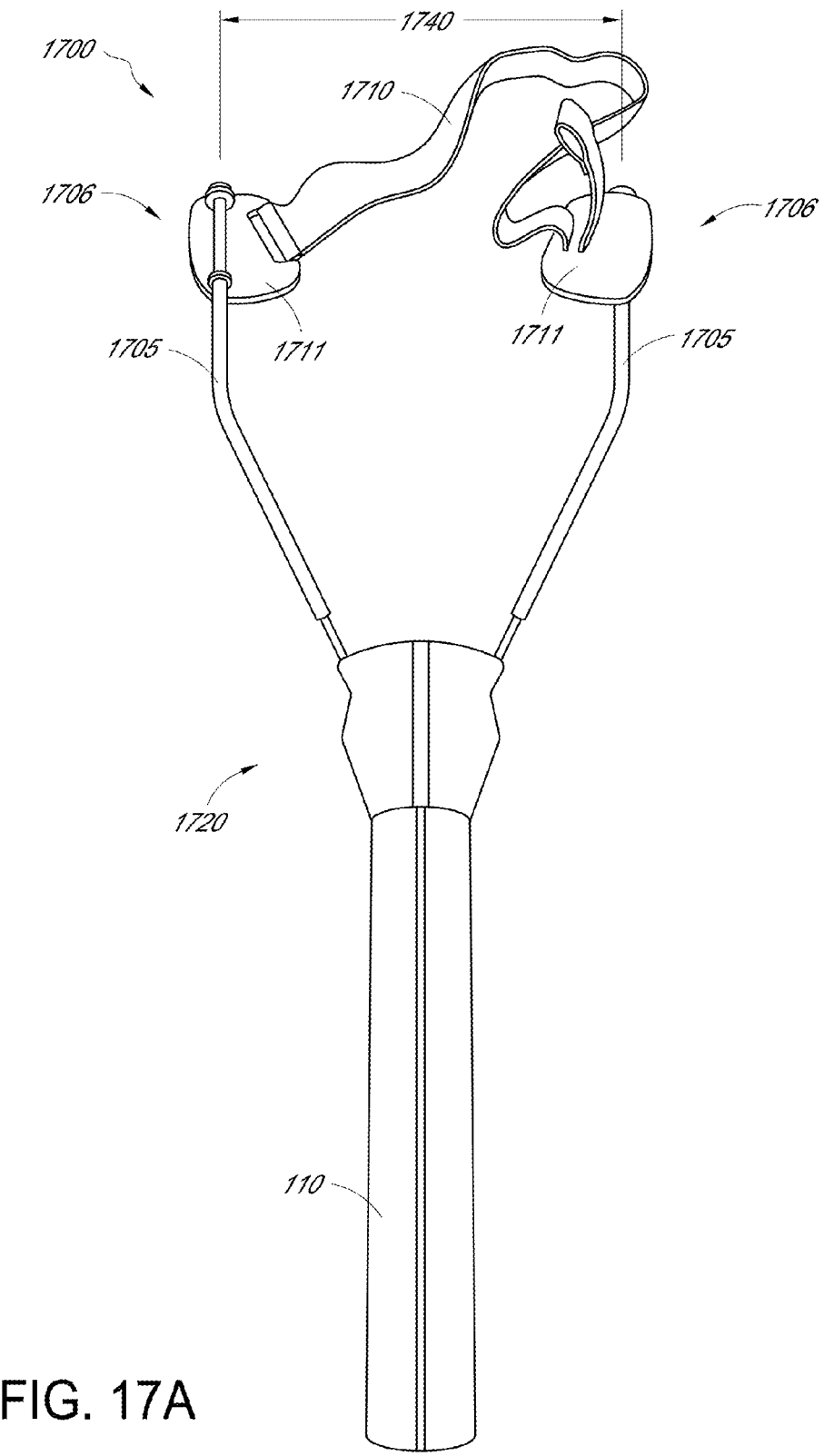
FIGS. 17A and 17B illustrate another embodiment of a head supporting device.
Figure 17B:
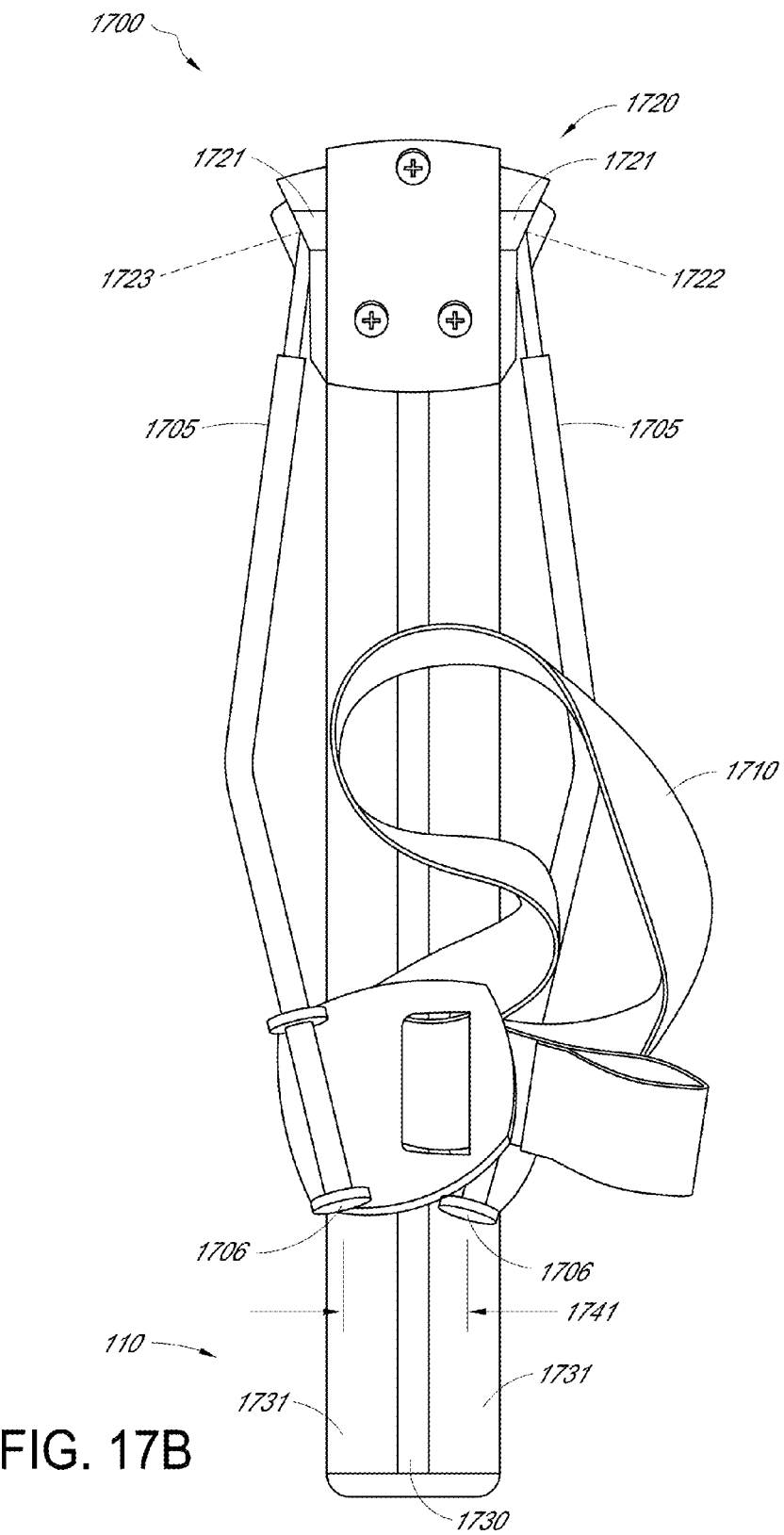

FIGS. 17A and 17B illustrate an embodiment of a head supporting device 1700 that is configured to position headband attachment points beside or lateral to a user's head. The head supporting device 1700 comprises a first member or anchor 110 having two support members 1705 movably coupled thereto through a joint portion 1720. In this embodiment, the support members 1705 are pivotally coupled to the first member 110. However, in various other embodiments, the support members may be movably coupled in other manners, such as, for example, slidably coupled, rotatably coupled (with one or more degrees of freedom), detachably coupled, and/or the like. In some embodiments, the support members are configured to be able to be removed from the first member 110 and reattached to the first member 110 in a different position (for example in a collapsed position or an expanded position).

The head supporting device 1700 comprises an expanded configuration and a collapsed configuration. FIG. 17A illustrates the head supporting device 1700 in the expanded configuration, while FIG. 17B illustrates the head supporting device 1700 in the collapsed configuration. The collapsed configuration illustrated in FIG. 17B is configured to enable the head supporting device 1700 to be relatively small and/or compact, for example, for easy portability when not being used to support a user's head. The expanded configuration, such as is shown in FIG. 17A, is the arrangement intended for use in supporting a user's head while in a seated position. As can be seen in FIGS. 17A and 17B, a band or strap 1710 is connected to the distal ends 1706 of the support members 1705. In this embodiment, the strap 1710 is coupled to the support members 1705 using band anchors 1711. The band anchors 1711 are pivotally or rotatably coupled to the support arms 1705 such that they can rotate about the distal end 1706 of the support arm 1705. Such a configuration can be desirable to, among other things, increase comfort, adjustability, and/or convenience of the device. In this embodiment, one band anchor 1711 is attached to one end of the band 1710, and the other band anchor 1711 incorporates a buckle or adjuster that enables the band 1710 to be repositioned, thus altering a usable length of the band 1710. In various other embodiments, band anchors may or may not be used. For example, the band 1710 may be connected directly to a support member 1705 at one or both ends. Further, in various other embodiments, adjustability of the band 1710 may be included at other locations, such as in the center or main portion of the band 1710 instead of at the band anchor 1711. Further, the head supporting device 1700 is configured to position the distal ends 1706 (e.g., the headband attachment points, the band anchors 1711, and/or the distal tips of the support members 1705) different distances from one another depending on whether the head supporting device 1700 is in the expanded or collapsed arrangement. For example, as can be seen in FIG. 17A, in the expanded arrangement, the distal ends 1706 are separated by a distance 1740. In the collapsed arrangement, as shown in FIG. 17B, the distal ends 1706 are separated by a smaller distance 1741. Such a configuration or design can be desirable to, among other things, enable the head supporting device 1700 to be more compact in the collapsed arrangement or configuration.

Various techniques may be utilized to enable the distal ends 1706 of the support members 1705 to be positioned further away from one another in the expanded configuration than in the collapsed configuration. For example, each of the two support members 1705 may be coupled to the first member 110 via its own pivot joint 1721. In some embodiments, the two pivot joints 1721 may comprise pivot axes (e.g., axes 1722, 1723) that are not in collinear alignment. By having pivot axes that are not in collinear alignment, the support members 1705, and more specifically, the distal ends 1706 of the support member 1705, will tend to get closer together or spread apart while the support members 1705 are rotated with respect to the first member 110.

Another example technique that may be used to enable the distal ends 1706 of the support members 1705 to become closer together or further apart comprises utilizing joints that have more than one axis of rotation. For example, a primary axis of rotation may comprise an axis of rotation that enables the support members 1705 to convert between the collapsed configuration and expanded configuration. For example, with reference to FIG. 17B, the primary axes of rotation for the pivot joints 1721 may comprise pivot axes 1722 and 1723. In some embodiments, the pivot joints 1721 may comprise at least one additional pivot axis or degree of freedom that enables the support members 1705 to rotate or otherwise move with respect to the first member 110 in a direction different than rotation about a pivot axis 1722 or 1723. For example, the joints 1721 may comprise an additional axis of rotation oriented generally perpendicular to the primary pivot axis 1722 or 1723. For example, with reference to FIG. 17B, such secondary axis may be oriented perpendicular to the plane of FIG. 17B. Such a secondary axis may, for example, enable the distal ends 1706 of the support members 1705 to move farther away from each other or closer to each other while in the expanded configuration, without requiring any additional rotation about the primary pivot axes 1722, 1723. Such functionality may be desirable, for example, to enable adjustment for various width heads, to allow for at least some range of lateral or sideways motion of the user's head, and/or the like.

In some embodiments, the joint portion 1720 of the head supporting device 1700 comprises one or more stop surfaces or other locking or range-limiting features configured to enable the joints 1721 to have a limited range of motion. For example, it may be desirable to enable the support members 1705 to rotate from the collapsed configuration into the expanded configuration, but to not rotate any further. Accordingly, the support members 1705 can be configured to fully or at least partially resist an external force applied to the support members 1705 (such as by a user leaning his or her head forward) that would otherwise cause the support members 1705 to rotate with respect to the first member 110. Additional details of such stop surfaces and other hinge or joint features are given below with reference to FIGS. 19A and 19B.

With further reference to FIGS. 17A and 17B, the head supporting device 1700 comprises a relatively minimalistic design that can be desirable to, among other things, reduce overall size and weight, such as to increase convenience and portability. In some embodiments, the first member or back anchor 110 is configured to be relatively long and narrow, such as to engage a user's spine but not laterally extending regions of the user's back, such as the user's shoulders. Such a design may increase comfort during use.

In some embodiments, the first member or anchor 110 can be configured to be rigid or substantially rigid. In some embodiments, the first member 110 can be configured to be at least partially flexible. For example, the first member 110 can be configured to be at least partially flexible, to at least partially conform to the shape of a seat and/or a user's back or spine. In some embodiments, the first member is elastically flexible, meaning the first member is configured to return to a free state shape when not in use. In other embodiments, the first member is plastically flexible, meaning it is configured to substantially retain its shape after having been conformed to the shape of the seat and/or the user's back. In some embodiments, the first member 110 is a composite structure comprising at least one stiffer component and at least one less stiff component. For example, as illustrated in FIG. 17B, the first member 110 of the head supporting device 1700 comprises a core 1730 that is stiffer than a surrounding material 1731. For example, the core 1730 may comprise a metal rod, and the surrounding or laterally extending material 1731 may comprise a polymer, rubber, cloth, and/or the like that is less stiff and/or may be more comfortable for the user.

In some embodiments, the support members 1705 comprise rods, such as, for example, a metal rod of generally cylindrical cross-section, such as is shown in FIGS. 17A and 17B. The rods may in some embodiments be at least partially covered with a softer or more comfortable material, such as cloth, plastic, and/or the like. The head supporting device 1700 comprises support members 1705 that are generally non-straight, having a bend in a middle section of the support members 1705. However, in other embodiments, the support members 1705 may be straight or may be any other shape. For example, a support member 1705 may be shaped so that the distal end 1706 where the strap 1710 attaches will be positioned in the expanded configuration adjacent to the side of a user's head. However, a central portion of the support members 1705 may be shaped to ensure clearance between the support member 1705 and other portions of the user's body, such as the user's shoulders. In some embodiments, utilizing straight support members 1705 is not desirable, because a central portion of that support member 1705 may come in contact with the user's shoulders and cause discomfort.

Further, although the support members 1705 of the head supporting device 1700 comprise rods having circular cross-sections, various other embodiments may comprise support members of other cross-sectional shapes. For example, a support member may comprise a rectangular, oval, or any other cross-sectional shape. Further, a support member may comprise one or more stiffening ribs and/or the like. Desirably, support members comprise a shape and material that gives sufficient stiffness to support a user's head, while minimizing size, weight, and/or manufacturing cost.

In some embodiments, the support members 1705 are coupled to the first member 110 using a spring-loaded joint or joint portion 1720. For example, the head supporting device 1700 may be configured to utilize one or more springs or similar structures to retain the head supporting device in the expanded and or collapsed arrangement or configuration. Further, in some embodiments, the joints that enable relative motion of the support member 1705 with respect to the first member 110 may comprise a feature or features, such as a spring-loaded portion or other friction-introduction mechanism, that at least partially resist relative motion of the support members 1705 with respect to the first member 110. Such a feature may be desirable, for example, to enable a more controlled conversion of the head supporting device 1700 between the expanded and collapsed arrangements and vice versa.

Although the embodiment illustrated in FIGS. 17A and 17B comprises two support members 1705, various other embodiments may comprise more or fewer support members. For example, some embodiments may comprise a single support member, three, four, five, or more support members.

In some embodiments, the distance 1740 between the distal ends 1706 (or headband attachment points or features) of the support member 1705 in the expanded or use configuration is configured to be at least as wide as an average adult human head. In some embodiments, the distance 1740 is more or less than the average width of an adult human head. In some embodiments, the distance 1740 is larger than the width of an average human head, such as to enable use with all users, and/or to enable at least some range of lateral or sideways motion of the user's head without the user contacting or engaging the distal ends 1706 of the support members 1705. In some embodiments, the distance 1740 is at least approximately 6 inches. In other embodiments, the distance 1740 is at least approximately 3 inches, 4 inches, 5 inches, 7 inches, 8 inches, 9 inches, 10 inches, 11 inches, 12 inches, 13 inches, 14 inches, 15 inches, 16 inches, 17 inches, or 18 inches.

In some embodiments, the support members 1705 comprise a material that is stiff enough to at least partially resist forward and/or lateral motion of a user's head, while allowing at least some elastic bending of the support members 1705 to enable the user to not feel too constrained within the head supporting device 1700. For example, the support members 1705 may comprise a metal having relatively elastic properties. In some embodiments, the support member 1705 may further comprise a coating or covering or jacket that, among other things, can be aesthetically pleasing, and/or more comfortable for the user if the user contacts the support member 1705 with, for example, his or her head.

Figure 18C:
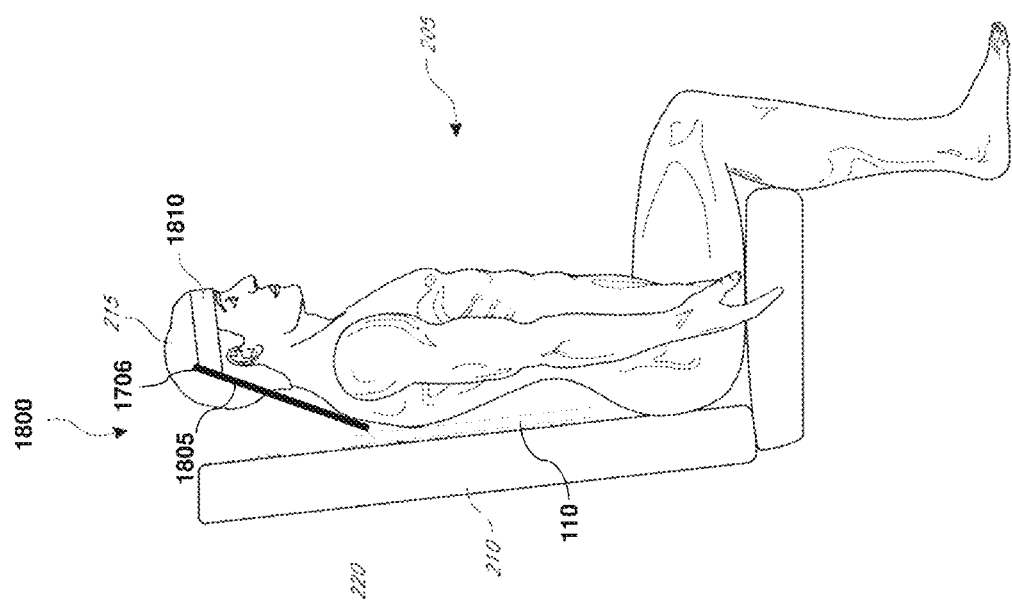
FIG. 18C illustrates the head supporting device of FIG. 18B in use by a user.

FIGS. 18A-18C illustrates another embodiment of a head supporting device 1800. The head supporting device 1800 is similar to the head supporting device 1700 illustrated in FIGS. 17A and 17B. One difference between the head supporting devices 1800 and 1700 is that the support members 1805 of the head supporting device 1800 are straight or relatively straight, as compared to the non-straight support members 1705 of the head supporting device 1700. The head supporting device 1800 comprises a first member or backplate anchor 110 movably coupled through a joint portion 1820 to the two support members 1805. Further, a strap or headband 1810 is attached to and extends between distal ends 1706 (e.g., headband attachment points) of the support members 1805. Similarly to the head supporting device 1700, the head supporting device 1800 comprises pivot joints 1821 that enable rotation of the support members 1805 with respect to the first member 110.

As with the head supporting device 1700, the pivot joints or hinges 1821 also comprise stop features or range limiting features that limit a range of rotation of the support members 1805 with respect to the first member 110. In this embodiment, the stop or range limiting features are not shown in FIGS. 18A-18C, but rather are internal to the pivot joints 1821.

FIG. 18A illustrates a top view of the head supporting device 1800 in an expanded arrangement. FIG. 18B illustrates a side view of the head supporting device 1800 in the expanded arrangement. FIG. 18C illustrates a side view of the head supporting device 1800 in the expanded arrangement and being used by a user 205. As can be seen in FIGS. 18B and 18C, the expanded arrangement comprises the support members 1805 extending from the first member 110 at an angle 1842 with respect to a reference plane 1843 (in this case defined by a longitudinal axis of the first member 110). The angle 1842 enables the distal ends 1706 to extend away from the seat back 210 and beside the user's head 215, as can be seen in FIG. 18C. As previously discussed, such a configuration can be desirable to, among other things, enable additional lateral or sideways rigidity or support for the user's head 215.

In this embodiment, the pivot joints 1821 comprise stop features that enable the support members 1805 to remain in the expanded position at angle 1842 even when the user's head 215 applies a force to the strap 1810 that would otherwise cause the angle 1842 to increase. In this embodiment, the angle 1842 in the expanded configuration is approximately 30 degrees. However, in other embodiments, the angle 1842 in the expanded configuration or arrangement may be larger or smaller. For example, a head supporting device may be configured to comprise an angle 1842 in an expanded arrangement or configuration that is at least approximately 5°, 10°, 15°, 20°, 25°, 30°, 35°, 40°, 45°, 50°, 55°, 60°, 65°, 70°, 75°, 80°, 85°, or 90°. Further, although in this embodiment the angle 1842 is measured with respect to a reference plane 1843 defined by a longitudinal axis of a straight first member or backplate 110, the angle 1842 may be measured differently in a configuration or design that utilizes a non-straight first member 110 and/or support member 1805. For example, the base reference plane 1843 with which to measure the angle 1842 to may comprise a surface of a seat, a plane drawn through contact points of a person's back with the seat, an approximation of a plane at which a user's back contacts a seat, a line drawn between a contact point of the user's shoulders with a seat and the user's lower back with the seat, and/or the like. Further, if the support member 1805 is not straight, the angle of the support member may be measured using a line that passes through the distal end 1706 and the joint 1821.

In some embodiments, rather than designing the head supporting device to position the distal ends 1706 and/or the attachment point of the strap 1810 at a particular angle with respect to the backplate, user's back, and/or seat, the head supporting device may be designed to position the distal ends or strap connection point a certain distance away from the seat or a plane defined by the seat, user's back, first member 110, and/or the like. For example, the distal end 1706 may be configured to, in the expanded configuration, be positioned at least approximately 1 inch, 2 inches, 3 inches, 4 inches, 5 inches, 6 inches, 7 inches, 8 inches, 9 inches, 10 inches, 11 inches, or 12 inches, away from the back of the seat, a plane defined by the backplate 110, a line passing through proximal and distal ends of the backplate 110, and/or the like.

Further, in some embodiments, the head supporting device may be configured to position the distal ends 1706 and/or attachment points of the strap 1810 to the support members 1805 at a specific position relative to the user's head. For example, some designs may be configured to position the distal ends 1706 at approximately the center (from front to back, viewed from the side) of an average user's head in a seated position. The embodiment illustrated in FIG. 18C shows the distal ends 1706 positioned behind that central position and at approximately a rear portion of the user's ears. However, in other embodiments, the distal ends 1706 may be configured to be positioned closer to the front or back of the user's head 215.

In some embodiments, a head supporting device is configured to be adjustable by an end user, such that the distal ends 1706 in the expanded configuration are positioned as desired by the user. For example, some users may desire the distal ends 1706 to be positioned closer to the seat, and thus further back with respect to the user's head. Other users, for example may prefer the distal ends 1706 to be further forward, such as further away from the seat. Further, the distance between the distal ends 1706 may be user-configurable. In some embodiments, user-configurability of the positioning of the distal ends is built in to the joints. In some embodiments, user-configurability of the positioning of the distal ends comprises using support members that are plastically deformable by the user, but still stiff enough to resist plastic deformation under normal head-supporting loads. As with other embodiments, the headband 1810 may also be adjustable, such as to adjust a length of it. The headband 1810 may also be configured to enable a sleeping mask or other accessory to be attached thereto.

It should be noted that, although the embodiment shown in FIG. 18C, and in various other figures, is shown with the first member 110 sandwiched between a user and a seat, alternate embodiments may be configured to attach to the user's back instead of requiring anchoring between a user and a seat. For example, the first member 110 may be configured to attach to a user's back by using straps that extend around the user's torso, connect to a piece of clothing, and/or the like. As another example, a shirt, such as a hooded sweatshirt, may be configured to integrate a head supporting device, such as the head supporting device 1700. In some embodiments, the hooded sweatshirt may comprise a pocket, cavity, hook and loop fasteners, and/or the like, for insertion therein or retention thereto of the first member 110. Further, the hood of the hooded sweatshirt may comprise one or more pockets, cavities, hook and loop fasteners, and/or the like, for insertion therein or retention thereto of the support members 1705.

Figure 19A:
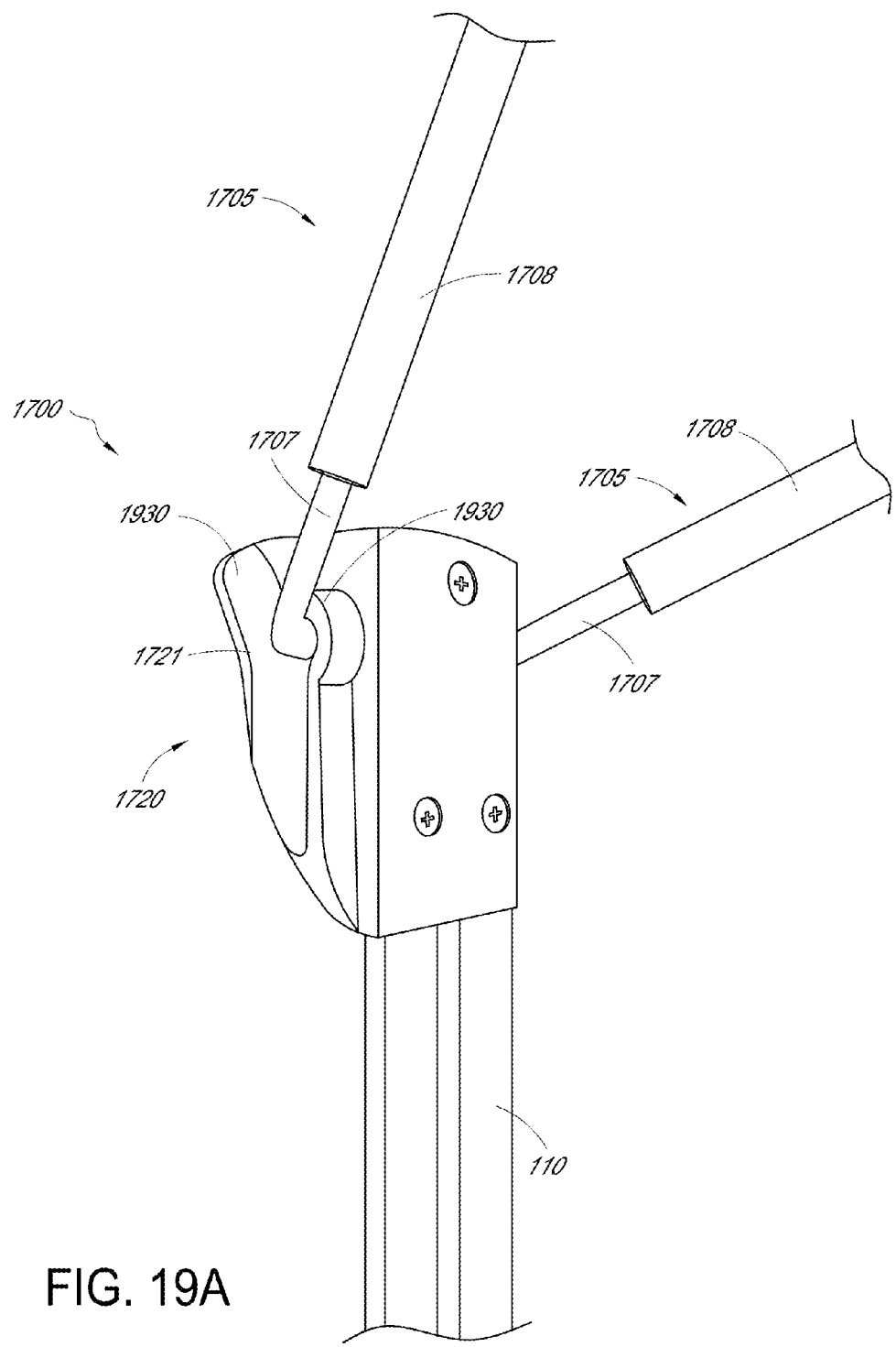
FIGS. 19A and 19B illustrate embodiments of joint portions of head supporting devices.
Figure 19B:
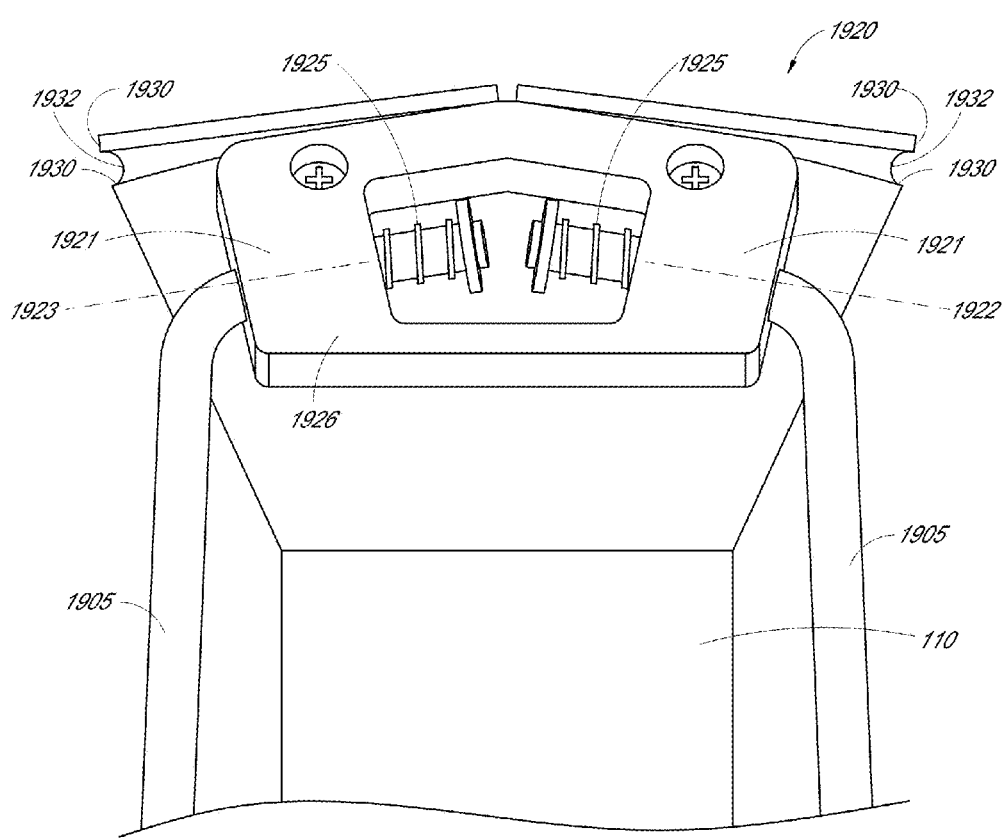

FIGS. 19A and 19B illustrate two embodiments of joint portions of head supporting devices, the joint portions being used to pivotally couple support members to an anchor member. FIG. 19A illustrates a more detailed view of the joint portion 1720 of the head supporting device 1700 of FIGS. 17A and 17B in a partially expanded configuration. The pivot joints 1721 each comprise a stop surface 1930 (shown in this view only for the near-side pivot joint 1721) which limits a range of rotation of the support members 1705. With reference to FIG. 19A, the near-side support member 1705, once engaged with or up against the stop surface 1930, would be restricted from rotating any further in a counterclockwise direction as viewed from FIG. 19A's perspective. When the head supporting device 1700 is in use with a user, forward leaning or forward motion of the user's head will tend to rotate the support member 1705 in that same counterclockwise direction. Accordingly, the stop surface 1930 enables the support member 1705 to resist that forward leaning motion. Although this embodiment illustrates a single stop surface 1930 that engages the support member 1705 to stop or restrict the range of pivoting of the arm 1705, more than one stop surface may be utilized in other embodiments. FIG. 19A also illustrates an embodiment of a support member 1705 that comprises a core 1707 and an outer cover 1708. In this embodiment, the core 1707 comprises a metal rod, and the outer cover 1708 comprises a more compliant, less stiff, more comfortable, and/or decorative material, such as cloth, rubber, and/or the like. In various other embodiments the core 1707 and cover 1708 may comprise different materials.

Further, although the joint illustrated in FIG. 19A is only configured to stop further counterclockwise rotation of the support member 1705 in the expanded configuration, some embodiments may comprise stop surfaces on either side of the support member 1705, to effectively lock the support member 1705 in the expanded configuration and limit rotation in both the clockwise and counterclockwise directions. Such an embodiment is illustrated in FIG. 19B. FIG. 19B comprises a joint portion 1920 of the first member 110 that pivotally couples support members 1905 to the first member 110. The support members 1905 are configured to pivot or rotate with respect to the first member 110 about pivot axes 1922 and 1923. As discussed above, it can be desirable for the pivot axes 1922, 1923 to be non-collinear, such as to enable distal ends of the support members 1905 two separate from each other while the support members 1905 are rotated from the collapsed arrangement or configuration to the expanded arrangement or configuration. Unlike FIG. 19A, the embodiment illustrated in FIG. 19B illustrates the head supporting device in the collapsed configuration instead of the expanded configuration.

The joint portion 1920 illustrated in FIG. 19B comprises a stop notch 1932 for each of the two support members 1905. The stop notch 1932 comprises opposing stop surfaces 1930 configured to limit rotation in either direction of the support members 1905 when they are in the expanded configuration. One difficulty in designing a device that limits rotation in both directions in the expanded configuration is that desirably there should be a relatively easy way for the user to position the support members 1905 into that expanded configuration (and then to re-collapse the device). With the embodiment illustrated in FIG. 19A, that only has a single stop surface 1930 for each support member 1705, the user can simply rotate the support member 1705 counterclockwise from the collapsed to the expanded configuration. With the embodiment illustrated in FIG. 19B, however, the user needs to be able to move the support members with respect to the first member 110 in a direction other than just pivoting around the pivot axes 1922, 1923 to enable the support members 1905 to be positioned within the notches 1932. Accordingly, the embodiment illustrated in FIG. 19B is configured to enable the proximal ends of the support members 1905 to be pulled outward along the pivot axes 1922, 1923. The joint portion 1920 comprises springs 1925 that are positioned to bias the support members 1905 in an inward direction. An outwardly applied force that overcomes the biasing force of the springs 1925 can enable the support members 1905 to clear a stop surface 1930 and then be contracted back into position within the stop notches 1932, effectively locking the support members 1905 in the expanded position. The springs 1925 continue to bias the support members 1905 inwardly to remain within the stop notches 1932 until a sufficient external force is applied that overcomes the biasing force of the springs 1925, enabling the support members 1905 to be pulled outward again and released from the stop notches 1932.

In other embodiments, other techniques may be used to selectively lock the support members in the expanded position. For example, one or more stop surfaces 1930 may be movable by the user. Further, although the embodiment illustrated in FIG. 19A is described as only having one stop surface 1930 for each support member 1705, the concepts illustrated in FIG. 19B may also be used with other embodiments, such as the embodiment illustrated in 19A. Accordingly, various embodiments of head supporting devices may be configured to effectively lock the support members in the expanded and/or collapsed configurations.

FIGS. 20A and 20B illustrate an alternative embodiment of a head supporting device 2000 that comprises two support members 2005 movably coupled to a first member or backplate anchor 110. A strap or headband 2010 is connected to and extends between distal ends of the support members 2005. The embodiment illustrated in FIGS. 20A and 20B is similar to the embodiment illustrated in FIGS. 18A and 18B. However, the head supporting device 2000 comprises a joint portion 2020 comprising sliding joints 2021, instead of pivot joints 1821. Accordingly, to convert the head supporting device 2000 between a collapsed and an expanded configuration, a user can slide the support members 2005 with respect to the first member 110 utilizing the sliding joints 2021.

In some embodiments, similarly to as described above, the head supporting device 2000 can be configured to enable distal ends of the support members 2005 to be further from each other in the expanded configuration than in the collapsed configuration. For example, the sliding joints 2021 may comprise sliding axes that are not parallel to each other, such that extending the support members 2005 causes distal ends of the support members 2005 to separate from each other. Further, the sliding joints 2021 may comprise a pivoting arrangement, such that when the support members 2005 are extended, the support members 2005 can also be rotated with respect to the first member 110, for example, about an axis generally perpendicular to the plane of the view of FIG. 20A. Further, in some embodiments, the head supporting device 2000 can be configured to enable distal ends of the support members 2005 to be rotated away from a plane defined by the first member 110, seatback, and/or user's back, to be put in a position similar to as shown in FIG. 18C next to a user's head. For example, the joint portion 2020 may be configured to enable the support members 2005 to rotate through at least a predetermined range about an axis generally perpendicular to the plane of the view of FIG. 20B.

In some embodiments disclosed herein, a head supporting device does not secure the user's head to any fixed part in particular but rather provides a simple support preventing the head of a seated user from leaning excessively forward or sideways. Examples of such embodiments are described above with reference to, for example, FIGS. 17A and 17B.

In some embodiments, a headband that contacts the user's forehead and temples is attached to two rigid or substantially rigid support members positioned on the backside of the user's head (for example, as described above with reference to FIGS. 17A and 17B). Those support members are connected to a backplate sandwiched between the user's back and a seat, using a pivot connection with limited range (for example, as shown in FIGS. 17A and 17B) or a sliding connection (for example, as shown in FIGS. 20A and 20B). When extended, the backplate and the support members act as one single rigid (or substantially rigid) member preventing the user's head from leaning forward. A forward leaning head is counteracted by an opposing force from the seat on the backplate. A sideways leaning head is counteracted by an opposing friction force from the seat on the backplate.

In some embodiments, a head supporting device does not restrict a user's head from leaning backward at all. In such an embodiment, a backward leaning user can recline his/her head as much as the seat physically allows him, given there is no extra cushion or plate separating the user's head and the headrest of the seat.

In some embodiments, the support members linking the headband to the backplate can have a very thin profile and therefore the collapsed head supporting device can be very compact and easy to store enabling superior portability (such as is shown in FIG. 17B). When in use, in some embodiments, the majority of the device can be hidden behind the user and presents itself as a simple sleep mask (or a simple headband if a sleep mask is not attached). The backplate itself can comprise a thin sheet of bent metal which gives it both flexibility and strength. It can also comprise hard plastic material (and/or softer plastic or other material).

In some embodiments, the headband can be made of a slightly stretchable material. The headband can be tightened on demand with a simple buckle system.

In some embodiments, the headband can also incorporate a sleep mask that can be attached to the headband using hook and loop fasteners, buttons, and/or the like. In some embodiments, the sleep mask can be attached to the headband in a way that allows sliding and/or repositioning. This, for example, allows the user to re-center the sleep mask anytime the headband tension is adjusted, such that the sleep mask can achieve the best coverage.

As discussed in more detail above, examples of relatively simple stop hinge mechanisms are shown in FIGS. 19A and 19B. The support rods can pivot around, for example, a spring loaded axis that gives the rods enough rigidity to support a user's head when snapped in place but also has enough wiggle room to allow alignment with the spine when in the collapsed position.

In some embodiments, a head supporting device can also be easily integrated with a clothing garment such as a hoodie, where it would fit in an internal sleeve along the spine of the hoodie. The rigid members could be hidden in the hoodie's hat and be available at the demand of the user. That type of integration further enhances the device's portability.

Embodiments disclosed herein include various advantages. For example, in some embodiments, a head supporting device only engages the user's spine and not user's shoulder. In some embodiments, a head supporting device uses a soft headband instead of a rigid forehead support. In some embodiments, a head supporting device comprises a headband that engages both the user's forehead and temples as opposed to just the forehead, allowing for better lateral support of the head. In some embodiments, a head supporting device is substantially more compact than other devices when folded, enabling easy transport and stowage. In some embodiments, a head supporting device has a relatively short backplate that does not extend to the back of the user's head. In some embodiments, a head supporting device comprises a headband connection at a point between the shoulder blades and not behind the user's head. In some embodiments, a head supporting device is configured to simply support the user's head from leaning forward and/or sideways, as opposed to fully splinting or tethering the head to the backplate. This added degree of freedom minimizes undue tension on the user's neck. It also allows for a more natural support, minimizing all likelihood of accumulating lower neck or upper back tension or discomfort caused by over-constraining the head to the backplate. In some embodiments, a head supporting device allows the user's head to fully engage the headrest germane to the seat, thereby maximize reclining angle and enhancing comfort.

Head Supporting Device Engaging a User's Chin

Figure 6:
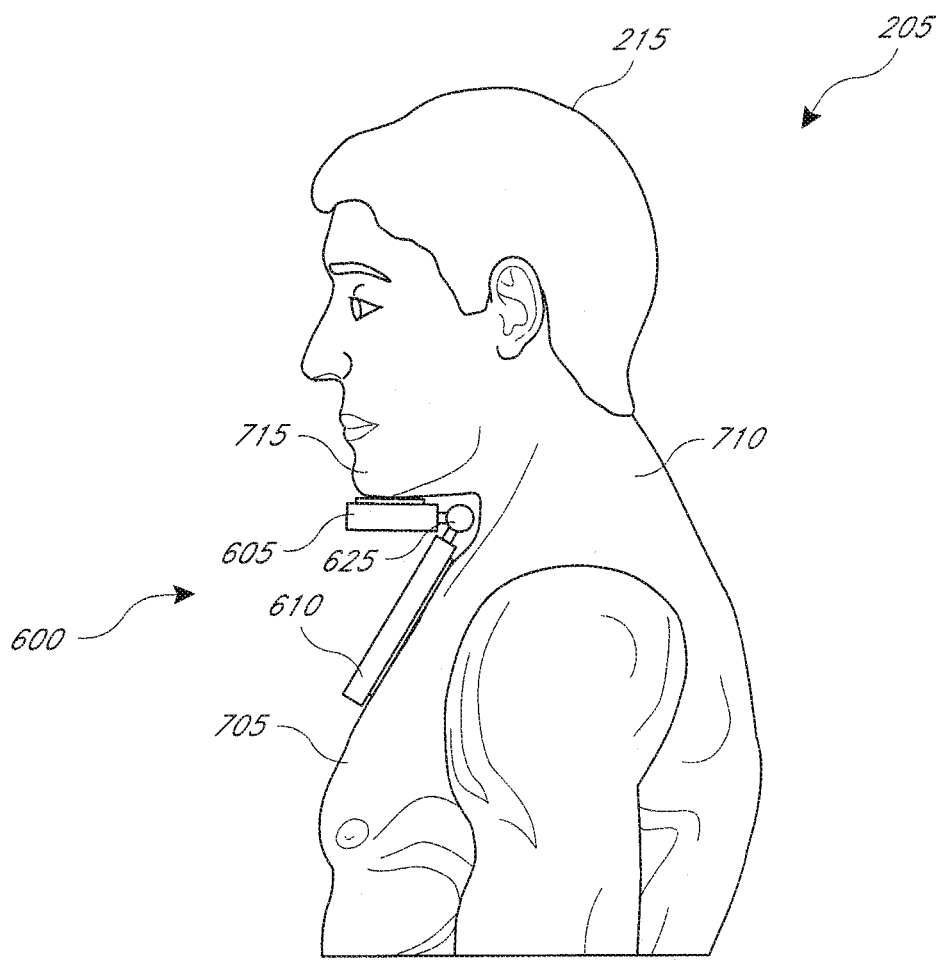
FIG. 6 is a side view of a user using a head supporting device according to an embodiment.

Some embodiments provide a head supporting device that holds or supports a user's head in a forward-leaning position by transferring the weight of the head to the user's chest area. As shown in FIG. 6, the head supporting device 600 comprises a chin support member 605 having a first surface configured to at least partially contact a chin 715 of a user 205 and a chest support member 610 having a second surface configured to at least partially contact a chest 705 of the user 205, wherein the chin support member 605 is coupled to the chest support member 610 with a connecting member 625.

The chin support member 605 and chest support member 610 may be made of any material sufficient to substantially maintain its form while supporting the weight of a user's head 215. A chin support member 605 or chest support member 610 may, for example, be made of nylon, other types of plastic, metal, wood, or a sufficiently stiff rubber material.

Figure 7:
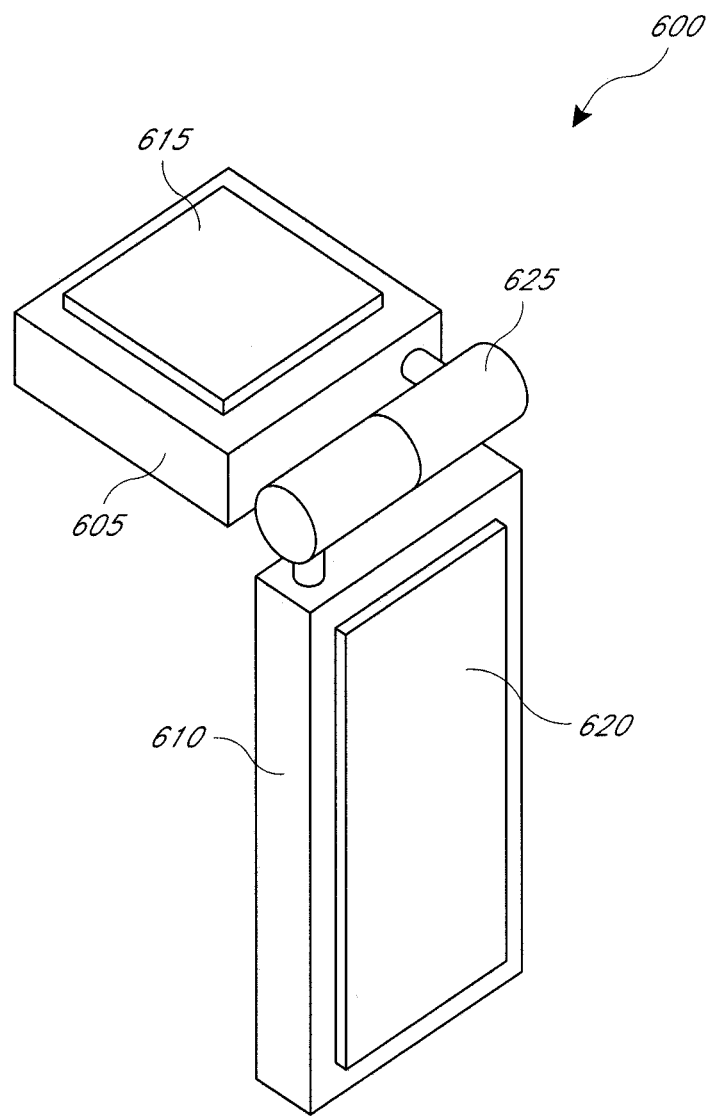
FIG. 7 is a perspective view of the head supporting device of FIG. 6 according to an embodiment.

In some embodiments, the first surface of the chin support member may include a chin pad 615 and the second surface may include a chest pad 620 (as shown in FIG. 7). The chin pad 615 and the chest pad 620 may provide comfort to the user, and may also provide some friction that can prevent the device from slipping during use. A chin pad or chest pad may be made of different materials as long as it provides comfort to the user and is reasonably gentle to the skin and bone area. Examples of materials for a chin or chest pad are: memory foams, cotton, neoprene, etc. In addition, the chin or chest pad may be configured to be easily interchangeable and washable. The chin or chest pad may be configured to attach to the chin or chest support member with hook-and-loop fasteners or Velcro.

An additional feature that a chin or chest pad may incorporate is the capability to release selected fragrances in order to enhance the relaxation of the user. The relatively small distance between the chin and chest pads and the user's nasal area makes it relatively easy to divert the desired fragrance from the chin or chest pad to the user's nose.

In some embodiments the connecting member 625 is a friction hinge, meaning the connecting member 625 will resist rotational forces applied to the chin support member 605 or chest support member 610, but will allow rotation once a predetermined level of rotational force has been applied to the connecting member 625. In other embodiments, the connecting member 625 is a position or lever-lock hinge, or any other type of connector that is able to sustain a preferred angle between the chin support member 605 and the chest support member 610. Position, lever-lock, and friction hinges hold doors, lids, and hatches in position, eliminating the need for latches, door holders, and other secondary support mechanisms. An example of a friction hinge is on the display of a laptop computer. A laptop computer display can often be positioned at any angle without secondary support. All of these hinges withstand an amount of rotational force, or torque, to hold doors in position. The greater the torque rating of the hinge, the greater the force required to change the angle of the hinge.

Figure 8:
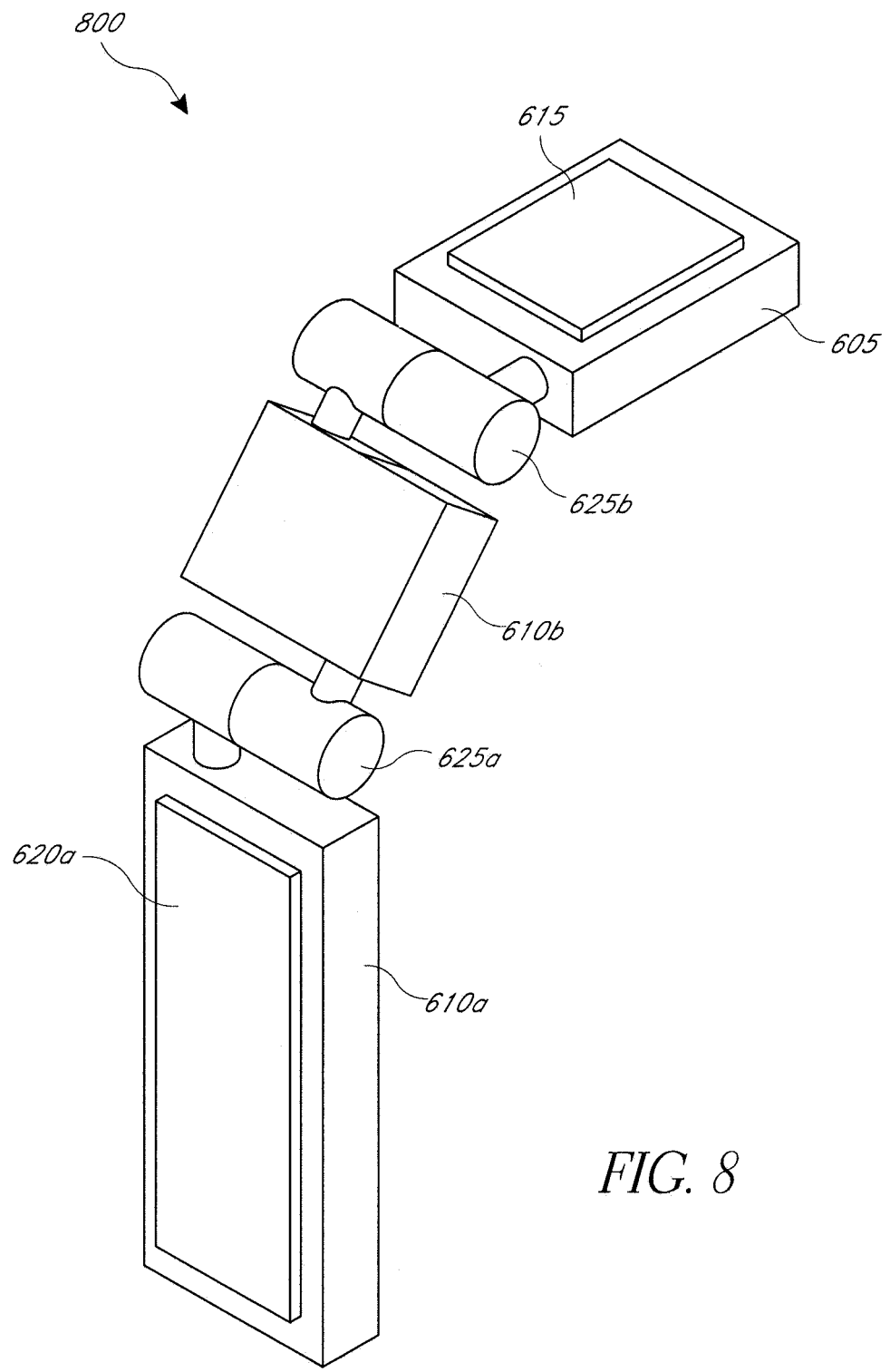
FIG. 8 is a perspective view of a head supporting device according to an embodiment.

In some embodiments, as shown in FIG. 8, a head supporting device 800 may include a double hinged chest support to enhance the adjustability of a head supporting device 800. The head supporting device 800 includes two chest support members 610a and 610b and two connecting members 625a and 625b. In use, the two chest support members 610a and 610b may be rotated relative to each other to more comfortably conform the head supporting device 800 to a user's chest 705. In some embodiments, one of the chest support members 610a may include a chest pad as described above. In other embodiments, both chest support members 610a and 610b may include chest pads on each of the chest supporting members. A double hinged design may therefore allow additional angle adjustability and may increase comfort.

Figure 9:
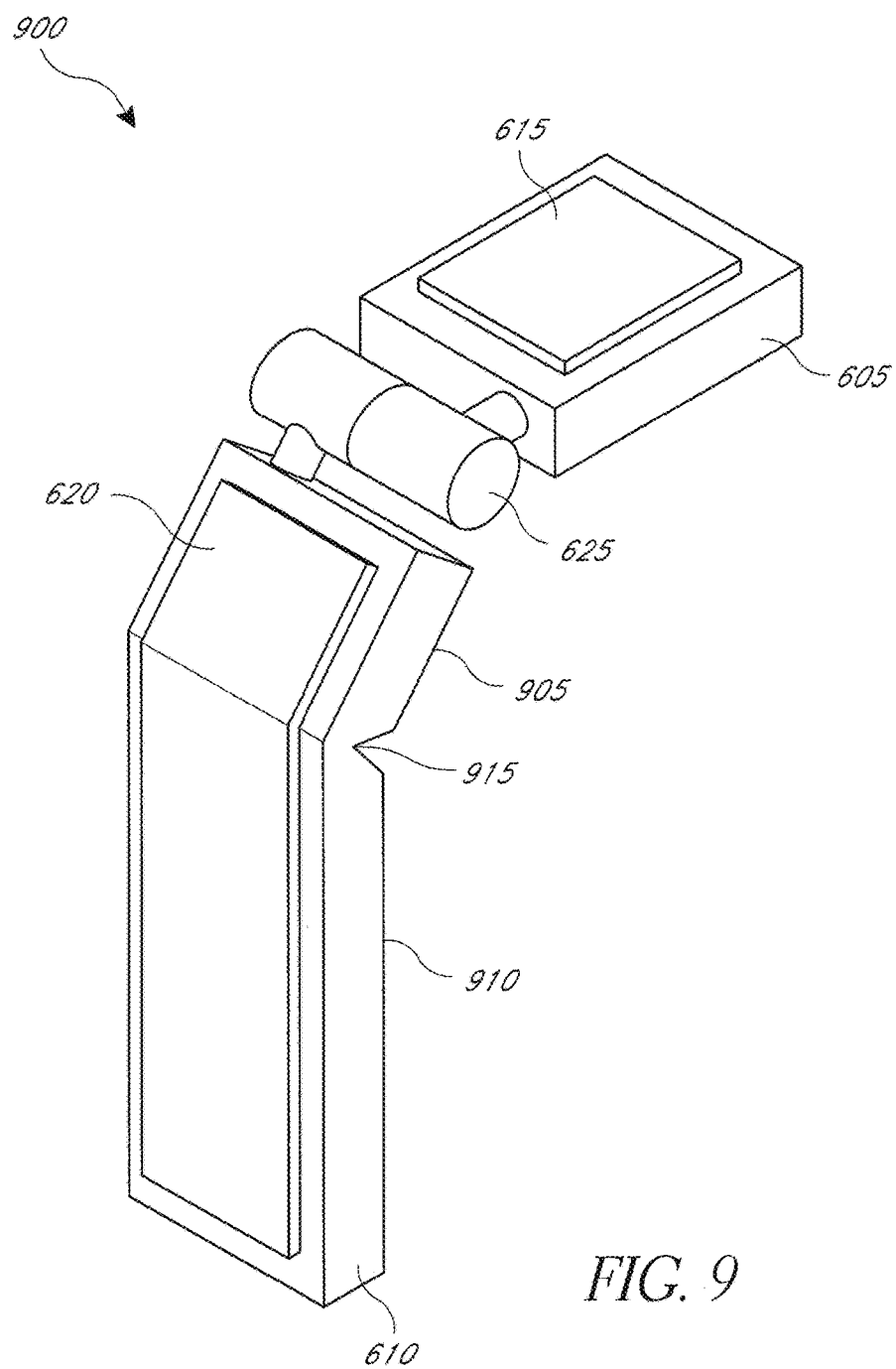
FIG. 9 is a perspective view of a head supporting device according to an embodiment.

In some embodiments, as shown in FIG. 9, a head supporting device 900 includes a flexible chest support. The head supporting device 900 includes a chest support member 610 that further includes an upper portion 905, a lower portion 910, and a flexible joint 915. The upper portion 905 of the chest support member 610 is flexibly connected to the lower portion 910 of the chest support member 610 through the flexible joint 915. In use, the flexible joint 915 flexes to allow the chest pad 620 to more comfortably conform to a user's chest. In some embodiments, the flexible joint 915 may comprise a portion of the chest support member 610 that has a thinner thickness than other portions of the chest support member 610, allowing the chest support member 610 to elastically bend at the flexible joint 915. In some embodiments, the chest support member may have more than one flexible joint. In other embodiments, there are more than one separate chest support members attached to the chest pad, using the chest pad as a flexible joint.

In some embodiments, a head supporting device, such as the head supporting device 600 shown in FIG. 6, may incorporate different accessories such as: an alarm clock and/or watch, a music player, a smart phone or other electronic device holder, or temperature control systems of the chin and the chest support members to enhance the user's comfort according to the ambient temperature. A head supporting device package can consist of a sleeping kit that includes a sleeping mask and ear plugs, ear phones, music player, etc.

In using a head supporting device, the user's chin 715 may rest on the chin support member 605 and the weight of the head 215 may be partially transferred to the chest 705 through the connecting member 625 and the chest support member 610. In some embodiments, the head supporting device 600 may be built in such way that an angle between the chin support member 605 and the chest support member 610 is variable and can be easily adjusted by a user in order to achieve the most comfortable position. A variable angle between the chin and chest members is referred to as (a) angle. In some embodiments, the angle between the chin and the chest may be between about 30 degrees and about 120 degrees.

The connecting member 625 supports the force created by the weight of the head 215 as well as the momentum created by this force in order to maintain the angle at the desired position. The average weight of the head of a person is around 5 kg. Therefore, the connecting member 625 may be able to sustain a vertical force of:

$$F = \text{weight} \times \text{gravity} = 5 \text{ kg} \times 9.8 \frac{m}{s^2} = 49N$$

The displacement of the center of gravity of the head 215 with respect the pivot point (the neck 710) is approximately 0 m to 0.1 m. Therefore, the expected momentum that the connecting member 625 may need to resist is:

$$M_{min} = F \times d_{min} = 49N \times 0m = 0Nm$$

and $$M_{max} = F \times d_{max} = 49N \times 0.1m = 4.9Nm$$

A suggested torque rating for the connecting member 625 is between 1 and 10 Nm. The angle ($\alpha$) that provides the most comfortable support varies from user to user and it ranges in between about 30 deg. to about 120 deg.

In order to anchor the chest support member 610 to the user 205, various methods of anchoring may be used. In some embodiments, a high friction chest pad is used. The chest pad 620 may incorporate a friction layer (or antiskid surface) in order to better anchor the head supporting device at the right position on the user's chest 705, such as the position shown in FIG. 6. A friction layer will increase the coefficient of friction between the chest support member 610 or chest pad 620 and the user's chest 705.

Some embodiments use a neck strap to anchor the head supporting device 600. An adjustable strap may be attached to the head supporting device 600 and surround the neck 710 of the user 205, thereby anchoring the head supporting device 600 at the desired position. The strap may be padded, non-padded, elastic, or rigid. Examples of materials for the strap are cotton, nylon, neoprene, or any other material sufficient to anchor the head supporting device 600.

In some embodiments, a friction back anchor may be used to anchor the head supporting device 600. This solution consists of an anchoring plate that is sandwiched in between the backrest of a seat and a user. A connecting strap connects to the anchoring plate, extends over the user's shoulders, and connects to the head supporting device 600, holding the head supporting device 600 in place beneath the user's head. As the user's head leans on the head supporting device 600, the exerted force is transferred to the anchoring plate through the connecting strap. It is the pressure applied by the user onto the seat that fixes the anchoring plate in place and prevents excessive movement of the head supporting device 600. The friction back anchor can be made of a high friction material and can also serve as a carrying bag for the head supporting device.

In some embodiments, a rigid backplate anchor is used to anchor the head supporting device (such as the devices 600, 800 or 900 as shown in FIGS. 7-9). The backplate anchor may be the similar to the first member 110 shown in FIG. 1. In some embodiments, the backplate anchor is the same as the first member 110 described herein. In other embodiments, the backplate anchor may be shorter than the embodiments of the first member 110. The head supporting device may be attached to the backplate anchor, with the backplate anchor being sandwiched between a user's back and a backrest of a seat. A strap or other connector may be used to connect the head supporting device to the backplate anchor. The momentum created by the force exerted by the head supporting device 600 on the backplate anchor is balanced out by the momentum created by a reaction force of the backrest on the backplate anchor.

In some embodiments, a backplate anchor, such as the first member 110 shown in FIG. 1, is used to anchor a head supporting device, such as the head supporting device 600, 800 or 900 shown in FIGS. 7-9, along with a support apparatus, such as the support apparatus 105 shown in FIG. 1. An object of such a device is to further support the head and neck and provide for an even more comfortable seating position.

The head supporting device embodiments described herein may provide certain advantages, including: providing true neck support by relieving neck muscles from balancing out the weight of the head, enabling or facilitating sleep on almost any seat, and providing a comfortable headrest when the seat does not provide one. Additionally, certain embodiments are small, thin, and lightweight travel accessories that can even fit in small laptop bags and that can be a platform for multiple objects allowing the user free use of his hands for other functions.

Certain embodiments include a padded member, which may be useful in situations where a seat does not include a headrest or the seat's backrest is too low. In those situations, the user can lean back onto the padded member and first member. In this mode, the first member behaves as an extension of the seat and provides a solid support where the head can rest.

The portability of a head supporting device makes it an ideal device to improve the comfort of any seat. Examples of situations where a head supporting device can be used are: sleeping, reading, or resting on an airplane, bus, train, etc.; or sleeping, reading, or resting at a work desk. A head supporting device may also be used to provide extra neck support while working on a computer or for any office chair that does not incorporate a headrest.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments. The headings used herein are for the convenience of the reader only and are not meant to limit the scope of the inventions or claims.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. Additionally, the skilled artisan will recognize that any of the above-described methods can be carried out using any appropriate apparatus. Further, the disclosure herein of any particular feature, aspect, method, property, characteristic, quality, attribute, element, or the like in connection with an embodiment can be used in all other embodiments set forth herein. Thus, it is intended that the scope of the present invention herein disclosed should not be limited by the particular disclosed embodiments described above.

What is claimed is:

1. A head supporting device comprising:
   an elongate anchor member for positioning between a back of a user and a seat;
   a first head support member movably coupled to a distal end of the anchor member;
   a second head support member movably coupled to the distal end of the anchor member; and
   a flexible band coupled to and extending between distal ends of the first and second head support members,
   wherein the first and second head support members each comprise a rod, a proximal end of the rod of the first head support member being pivotally coupled to the distal end of the anchor member by a first pivot joint, a proximal end of the rod of the second head support member being pivotally coupled to the distal end of the anchor member by a second pivot joint.

2. The head supporting device of claim 1, further comprising a collapsed arrangement and an expanded arrangement, wherein, in the collapsed arrangement, the distal ends of the first and second head support members are nearer to each other than in the expanded arrangement.

3. The head supporting device of claim 2, wherein, in the expanded arrangement, the distal ends of the first and second head support members are spaced apart by at least 6 inches.

4. The head supporting device of claim 1, wherein pivot axes of the first and second pivot joints are in collinear alignment.

5. The head supporting device of claim 1, wherein pivot axes of the first and second pivot joints are not in collinear alignment.

6. The head supporting device of claim 1, wherein the pivot joints are configured to enable the head support members to each rotate with respect to the anchor member about more than one axis.

7. The head supporting device of claim 6, wherein a primary axis of rotation for each head support member enables the head supporting device to transform between a collapsed arrangement and an expanded arrangement, and wherein a secondary axis of rotation for each head support member enables the distal ends of the first and second head support members to be moved nearer to or further from each other.

8. The head supporting device of claim 1, wherein the pivot joints each comprise at least one stop surface configured to limit a range of rotation of the head support members with respect to the anchor member.

9. The head supporting device of claim 1, wherein the anchor member comprises an elastically flexible portion at least partially conformable to a curvature of a seat or a back of a user, wherein, in a relaxed state, the elastically flexible portion is substantially straight.

10. The head supporting device of claim 1, wherein the anchor member comprises an elongate metal core at least partially encapsulated within a material having lower stiffness than the metal core.

11. The head supporting device of claim 1, wherein a length of the flexible band extending between the distal ends of the first and second head support members is adjustable.

12. A head supporting device comprising:
an anchor member configured to be at least partially sandwiched between a user and a seat;
a support apparatus moveably coupled to a distal end of the anchor member, the support apparatus comprising a flexible band coupled to and extending between first and second attachment points of the support apparatus;
a collapsed arrangement wherein the first and second attachment points are positioned adjacent each other; and
an expanded arrangement wherein the first and second attachment points are spaced apart a distance greater than in the collapsed arrangement, and wherein the first and second attachment points are positioned further away from a proximal end of the anchor member than in the collapsed arrangement,
wherein the support apparatus comprises first and second rods, wherein proximal ends of the rods are moveably coupled to the anchor member, a distal end of the first rod comprises the first attachment point, and a distal end of the second rod comprises the second attachment point.

13. The head supporting device of claim 12, wherein the rods are pivotally coupled to the anchor member.

14. The head supporting device of claim 12, wherein the rods are slidably coupled to the anchor member.

15. The head supporting device of claim 12, wherein, in the expanded arrangement, the first and second attachment points are spaced apart by at least 6 inches.

* * * * *